United States Patent
Short et al.

(10) Patent No.: US 11,423,471 B2
(45) Date of Patent: Aug. 23, 2022

(54) METHODS AND SYSTEMS FOR AUTOMATED SELECTION AND ORDERING OF HAIR PRODUCTS

(71) Applicant: Meazure Me Custom HD, LLC, Bolingbrook, IL (US)

(72) Inventors: Antonique Short, Plainfield, IL (US); Desma Short, Crest Wood, IL (US); Alexis Bedoret, Solana Beach, CA (US)

(73) Assignee: Meazure Me Custom HD, LLC, Bolingbrook, IL (US)

( * ) Notice: Subject to any disclaimer, the term of this patent is extended or adjusted under 35 U.S.C. 154(b) by 0 days.

(21) Appl. No.: 17/395,768

(22) Filed: Aug. 6, 2021

(65) Prior Publication Data

US 2021/0366034 A1 Nov. 25, 2021

Related U.S. Application Data

(63) Continuation of application No. 17/307,144, filed on May 4, 2021.

(60) Provisional application No. 63/019,632, filed on May 4, 2020.

(51) Int. Cl.
| | |
|---|---|
| G06Q 30/00 | (2012.01) |
| G06Q 30/06 | (2012.01) |
| G06N 20/00 | (2019.01) |
| G06T 19/00 | (2011.01) |
| A45D 44/00 | (2006.01) |
| A41G 3/00 | (2006.01) |
| G06T 19/20 | (2011.01) |

(52) U.S. Cl.
CPC .......... *G06Q 30/0643* (2013.01); *A41G 3/00* (2013.01); *A45D 44/005* (2013.01); *G06N 20/00* (2019.01); *G06Q 30/0621* (2013.01); *G06Q 30/0633* (2013.01); *G06T 19/006* (2013.01); *G06T 19/20* (2013.01); *G06Q 30/0631* (2013.01); *G06T 2200/08* (2013.01); *G06T 2200/24* (2013.01)

(58) Field of Classification Search
CPC .................................................. G06T 19/006
See application file for complete search history.

(56) References Cited

U.S. PATENT DOCUMENTS

| | | | |
|---|---|---|---|
| 2010/0033484 A1* | 2/2010 | Kim | G06T 19/006 345/426 |
| 2012/0087563 A1* | 4/2012 | Ionasec | G06T 17/00 382/131 |
| 2013/0063487 A1* | 3/2013 | Spiegel | G06Q 30/02 345/633 |
| 2014/0178029 A1* | 6/2014 | Raheman | G06T 19/006 386/224 |
| 2014/0225888 A1* | 8/2014 | Bell | G06T 19/00 345/419 |

(Continued)

*Primary Examiner* — Charles Tseng
(74) *Attorney, Agent, or Firm* — Maier & Maier, PLLC

(57) ABSTRACT

A system for the viewing and selection of hair products includes a processor configured to obtain customer identification information characterizing one or more characteristics of a customer and to obtain customer measurement information characterizing one or more physical measurements of the customer. The processor also obtains selected product information characterizing a selected hair product of the customer and sends finalized order information regarding the selected hair product.

16 Claims, 20 Drawing Sheets

(56) References Cited

U.S. PATENT DOCUMENTS

| | | | |
|---|---|---|---|
| 2015/0217465 A1* | 8/2015 | Krenik | B26B 19/388 |
| | | | 700/90 |
| 2017/0330380 A1* | 11/2017 | Ahn | G06K 9/00892 |
| 2018/0137663 A1* | 5/2018 | Rodriguez | G06T 11/60 |
| 2020/0327670 A1* | 10/2020 | Connor | G06T 7/62 |

* cited by examiner

METHODS AND SYSTEMS FOR AUTOMATED SELECTION AND ORDERING OF HAIR PRODUCTS

RELATED APPLICATIONS

This application claims priority to and the benefit of U.S. patent application Ser. No. 17/307,144 filed on May 4, 2021 and U.S. Provisional Patent Application No. 63/019,632 filed on May 4, 2020. The contents of the foregoing application is hereby incorporated by reference in its entirety.

FIELD

The present disclosure relates to methods and systems for the automated selection and ordering of hair products. In particular, the present disclosure relates to methods and systems for the automatic determination of characteristics of a customer in order to select and/or order appropriate hair products such as wigs, extensions or other hair products.

BACKGROUND

This section provides background information related to the present disclosure which is not necessarily prior art.

Customers often seek professional assistance to choose which hair product to purchase. Such hair products can include wigs, hair extensions, toupees, hair pieces and the like. Such professional assistance can be difficult to obtain due to many various factors such as professional availability, a customer's availability or the ability of a customer to travel to a professional's location. For example, professional hair consultants may only be available during working hours or may not be located near to the geographical location of a customer. Furthermore, a customer may have a busy work schedule, may be medically confined to particular locations, may have mobility issues or may have other conditions that limit the customer's ability to meet with a professional hair consultant.

Professional hair consultants or professional hair services can provide various services to customers. Such services can include measuring, fitting or otherwise providing information regarding the fit of a hair product. The services may also include providing information to the customer in the nature of style, material, cost, and other information so that a customer can be well informed before committing to purchase a hair product. Customer's often desire to discuss the purchase of a hair product with a professional hair consultant prior to purchasing. Therefore, there exists a need in the marketplace to provide the benefits and/or services of a professional hair consultant with increased availability.

SUMMARY

This section provides a general summary of the disclosure, and is not a comprehensive disclosure of its full scope or all of its features.

The systems and methods of the present disclosure can be embodied in some examples in both a mobile and web based application (app or other tool) with a fully integrated ecommerce website, designed to sell custom human hair wigs, human hair extensions and other hair and head accessories. Various embodiments can utilize the functions of a smartphone, computer (laptop or desktop), tablet, digital camera or digital video recorder and allow the consumer to take custom measurements of their head, choose the specific hair, cut, color, texture and style, and allow the consumer to create a fully customized wig. If the consumer is unable to scan their head using a "smart device", various other features and functionality of the methods and systems of the present disclosure can allow the customer to upload photos of their head in order to get the proper measurements and continue to create a customized wig or accessory. Once the consumer has completely customized their wig, the systems of the present disclosure in various other aspects can allow the customer to see what the wig looks like on them, using augmented reality. By using the embodiments of the present disclosure and taking custom digital measurements of the head, the systems and methods can includes various other aspects to sell other custom made hair, hair extensions and beauty products, such as wig caps, scarves, fabrics, stocking caps, hats, and other garments. The systems and methods of the present disclosure can include a healthcare division specifically designed for cancer patients or any other patients in need of a fully customized wig or hair piece. The systems and methods of the present disclosure can also include a business to business component allowing other independent hair stylists and salons to utilize the functionality of the app and sell their own products (wig, hair, etc.), while paying a commission for use of the systems and methods of the present disclosure.

In one embodiment of the present disclosure, a system for the viewing and selection of hair products is provided. The system may include a processor configured to obtain customer identification information characterizing one or more characteristics of a customer and to obtain customer measurement information characterizing one or more physical measurements of the customer. The processor can also obtain selected product information characterizing a selected hair product of the customer and send finalized order information regarding the selected hair product.

In another aspect of the present disclosure, the finalized order information can be sent to a vendor. The vendor can be a registered user of the system and can offer the selected hair product for sale on the system.

In another aspect, the processor can be further configured to build a three dimensional model of the customer based on customer image data.

In another aspect, the customer measurement information can be determined by the processor based on a three dimensional model of the customer.

In another aspect, the processor can be further configured to obtain at least two images of the customer to determine a three dimensional model of the customer.

In another aspect, the processor can be configured to automatically build a three dimensional model of the customer using a machine learning model and at least one image of the customer.

In another aspect, the processor can be configured to display a builder interface. The builder interface can include a feature shell selector that is configured to display a feature shell overlaying the images of the customer.

In another aspect, the builder interface can include at least one shell modification shell control that is configured to modify one or more parameters of the feature shell.

In another aspect, the feature shell can include a predetermined three dimensional model of a human head.

In another aspect, the processor can be further configured to store a three dimensional model of the customer after the feature shell is fit to the at least two images of the customer.

In another aspect, the builder interface can include a dimensional tool that is configured to measure at least one dimension of the customer's head.

In another aspect, the processor can be further configured to display a representation of the customer wearing the selected hair product.

In another aspect, the representation of the customer wearing the selected hair product includes a three dimensional model of the customer.

In another aspect, the representation of the customer wearing the selected hair product includes a three dimensional model of the selected hair product.

In another aspect, the processor can be configured to build the three dimensional model of the customer based on at least two images of the customer obtained by the processor.

In another aspect, the processor can be configured to obtain an augmented reality package of the selected hair product for display to the customer.

In some embodiments of the present disclosure, a method of selecting a hair product for use by a customer is provided. The method may include obtaining customer identification information characterizing one or more characteristics of a customer and obtaining customer measurement information characterizing one or more physical measurements of the customer. The method may also include obtaining selected product information characterizing a selected hair product selected of the customer and sending finalized order information regarding the selected hair product.

In another aspect, the method may also include displaying a builder interface wherein the builder interface includes a feature shell selector that is configured to display a feature shell overlaying images of the customer and fitting the feature shell to the images of the customer by modifying one or more parameters of the feature shell.

In another aspect, the method may also include displaying a hair product selection interface wherein the hair product selection interface includes a representation of the customer wearing the selected hair product.

In some embodiments of the present disclosure an apparatus for building a three dimensional model of a customer for use in a hair product selection system is provided. The apparatus may include a data acquisition engine configured to obtain customer image data characterizing one or more features of the customer and a measurement engine comprising a builder interface. The builder interface may include a feature shell selector to select a predetermined three dimensional feature shell from a plurality of three dimensional feature shells and at least one shell modification controls to modify the predetermined three dimensional feature shell in order to fit the predetermined three dimensional shell to the customer image data.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
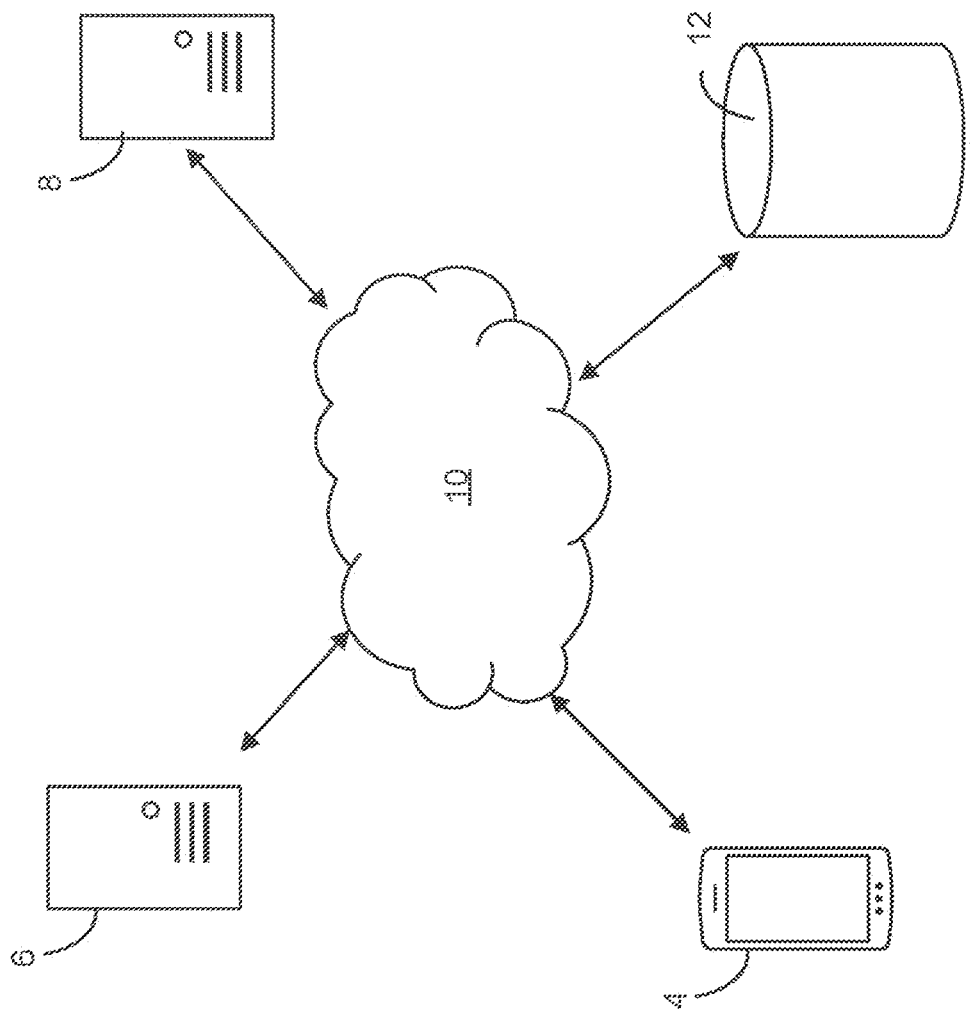
FIG. 1 is a block diagram illustrating one embodiment of the hair product selection system of the present disclosure.

Example embodiments will now be described more fully with reference to the accompanying drawings. For purposes of the description hereinafter, it is to be understood that the embodiments described below may assume alternative variations and embodiments. It is also to be understood that the specific articles, compositions, and/or processes described herein are exemplary and should not be considered as limiting. In the description, relative terms such as "lower," "upper," "horizontal," "vertical,", "above," "below," "up," "down," "top" and "bottom" as well as derivative thereof (e.g., "horizontally," "downwardly,"

"upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

In the present disclosure the singular forms "a," "an," and "the" include the plural reference, and reference to a particular numerical value includes at least that particular value, unless the context clearly indicates otherwise. When values are expressed as approximations, by use of the antecedent "about," it will be understood that the particular value forms another embodiment. As used herein, "about X" (where X is a numerical value) preferably refers to ±10% of the recited value, inclusive. For example, the phrase "about 8" preferably refers to a value of 7.2 to 8.8, inclusive. Where present, all ranges are inclusive and combinable. For example, when a range of "1 to 5" is recited, the recited range should be construed as including ranges "1 to 4", "1 to 3", "1-2", "1-2 & 4-5", "1-3 & 5", "2-5", and the like. In addition, when a list of alternatives is positively provided, such listing can be interpreted to mean that any of the alternatives may be excluded, e.g., by a negative limitation in the claims. For example, when a range of "1 to 5" is recited, the recited range may be construed as including situations whereby any of 1, 2, 3, 4, or 5 are negatively excluded; thus, a recitation of "1 to 5" may be construed as "1 and 3-5, but not 2", or simply "wherein 2 is not included." It is intended that any component, element, attribute, or step that is positively recited herein may be explicitly excluded in the claims, whether such components, elements, attributes, or steps are listed as alternatives or whether they are recited in isolation.

As shown in FIG. 1, the hair product selection system 2 of the present disclosure can include a mobile computing device 4, a hair product selector 6, a hair product provider system 8, a database 12 and a network 10. The hair product selection system 2 can be implemented in many different ways and only one example is shown.

In the example, shown the mobile computing device 4, the hair product selector 6, and the hair product provider system 8 can each be any suitable computing device that includes any hardware or hardware and software combination for processing and handling information. For example, each can include one or more processors, one or more field-programmable gate arrays (FPGAs), one or more application-specific integrated circuits (ASICs), one or more state machines, digital circuitry, or any other suitable circuitry. In addition, each can transmit data to, and receive data from, communication network 10.

In some examples, the hair product selector 6, and the hair product provider system 8 can each be a computer, a workstation, a laptop, a server such as a cloud-based server, or any other suitable device. The mobile computing device 4 can be a cellular phone, a smart phone, a tablet, a personal assistant device, a voice assistant device, a digital assistant, a laptop, a computer, or any other suitable device. In one example, the hair product selector 6 is operated by a service provider and/or vendor of hair products and hair product services and the hair product provider system 8 is operated by retailer or local service provider (e.g., a salon, shop owner, etc.). The mobile computing device 4 can be operated by customers or clients. The hair product selection system 2 can operate to communicate information and provide functionality, as will be further described, between the vendors, local service providers and customers.

The communication network 10 can be any suitable communication system to receive, transmit and/or exchange information between local or remote elements of the system 2. The communication network 10 can be a WiFi® network, a cellular network such as a 3GPP® network, a Bluetooth® network, a satellite network, a wireless local area network (LAN), a network utilizing radio-frequency (RF) communication protocols, a Near Field Communication (NFC) network, a wireless Metropolitan Area Network (MAN) connecting multiple wireless LANs, a wide area network (WAN), or any other suitable network. Communication network 10 can provide access to, for example, the Internet.

The database 12 can be a remote storage device, such as a cloud-based server, a memory device on another application server, a networked computer, or any other suitable remote storage. Although shown remote to the other elements of system 2, in some examples, database 12 can be a local storage device, such as a hard drive, a non-volatile memory, or a USB stick.

Figure 2:
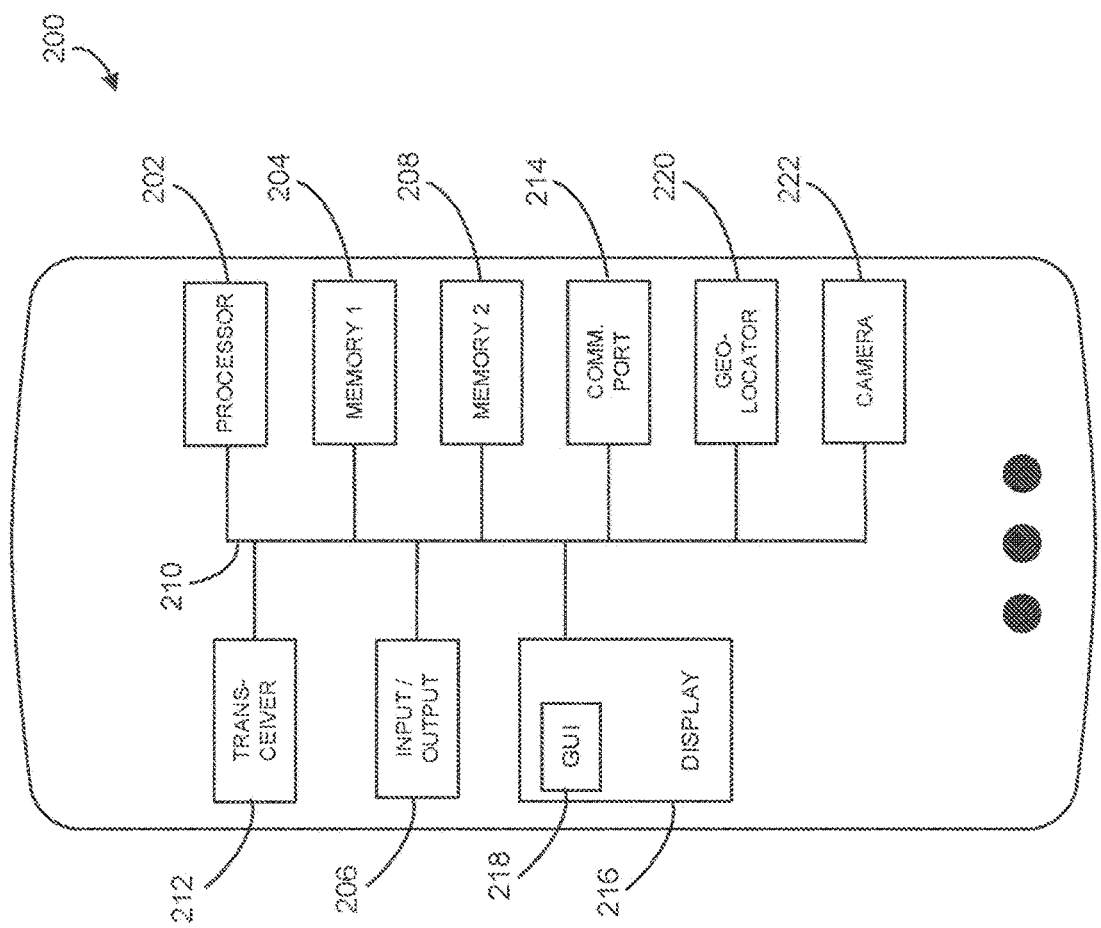
FIG. 2 is an illustration of an example computing device that can be used in one or more elements of the hair product selection systems of the present disclosure.

FIG. 2 shows an example computing device that can be used in the various elements of the system 2. For example, the hair product selection system 2, the mobile computing device 4, the hair product selector 6, the hair product provider system 8 or any other device of the present disclosure can include the elements shown in FIG. 2.

As shown, the computing device 200 may include one or more processors 202, working memory 204, one or more input/output devices 206, instruction memory 208, a transceiver 212, one or more communication ports 214, a display 216, a geo-locator 220, a camera 222 all operatively coupled to one or more data buses 210. Data buses 210 allow for communication among the various devices. Data buses 210 can include wired, or wireless, communication channels.

Processors 202 can include one or more distinct processors, each having one or more cores. Each of the distinct processors can have the same or different structure. Processors 202 can include one or more central processing units (CPUs), one or more graphics processing units (GPUs), application specific integrated circuits (ASICs), digital signal processors (DSPs), and the like.

Processors 202 can be configured to perform a certain function or operation by executing code, stored on instruction memory 208, embodying the function or operation. For example, processors 202 can be configured to perform one or more of any function, method, or operation disclosed herein.

Instruction memory 208 can store instructions that can be accessed (e.g., read) and executed by processors 202. For example, instruction memory 208 can be a non-transitory, computer-readable storage medium such as a read-only memory (ROM), an electrically erasable programmable read-only memory (EEPROM), flash memory, a removable disk, CD-ROM, any non-volatile memory, or any other suitable memory.

Processors 202 can store data to, and read data from, working memory 204. For example, processors 202 can store a working set of instructions to working memory 204, such as instructions loaded from instruction memory 208. Processors 202 can also use working memory 204 to store dynamic data created during the operation of the computing device 200. Working memory 204 can be a random access memory (RAM) such as a static random access memory (SRAM) or dynamic random access memory (DRAM), or any other suitable memory.

Input-output devices 206 can include any suitable device that allows for data input or output. For example, input-output devices 206 can include one or more of a keyboard, a touchpad, a mouse, a stylus, a touchscreen, a physical button, a speaker, a microphone, or any other suitable input or output device.

Communication port(s) 214 can include, for example, a serial port such as a universal asynchronous receiver/transmitter (UART) connection, a Universal Serial Bus (USB) connection, or any other suitable communication port or connection. In some examples, communication port(s) 214 allows for the programming of executable instructions in instruction memory 208. In some examples, communication port(s) 214 allow for the transfer (e.g., uploading or downloading) of data, such as customer information, vendor information, product information and the like.

Display 216 can display a customer interface 218. Customer interfaces 218 can enable customer interaction with the hair product selector 6. For example, customer interface 218 can be a customer interface that allows an operator to interact, communicate, control and/or modify different features or parameters of the computing device 200. The customer interface 218 can, for example, display products, enable data input screens, display measurement screens, display augmented reality interfaces and the like. In some examples, a customer can interact with customer interface 218 by engaging input-output devices 206. In some examples, display 216 can be a touchscreen, where customer interface 218 is displayed on the touchscreen.

Transceiver 212 allows for communication with a network, such as the communication network 10 of FIG. 1. For example, if communication network 10 of FIG. 1 is a cellular network, transceiver 212 is configured to allow communications with the cellular network. In some examples, transceiver 212 is selected based on the type of communication network 10 the computing device 200 will be operating in. Processor(s) 202 is operable to receive data from, or send data to, a network, such as communication network 10 of FIG. 1, via transceiver 212.

Figure 3:
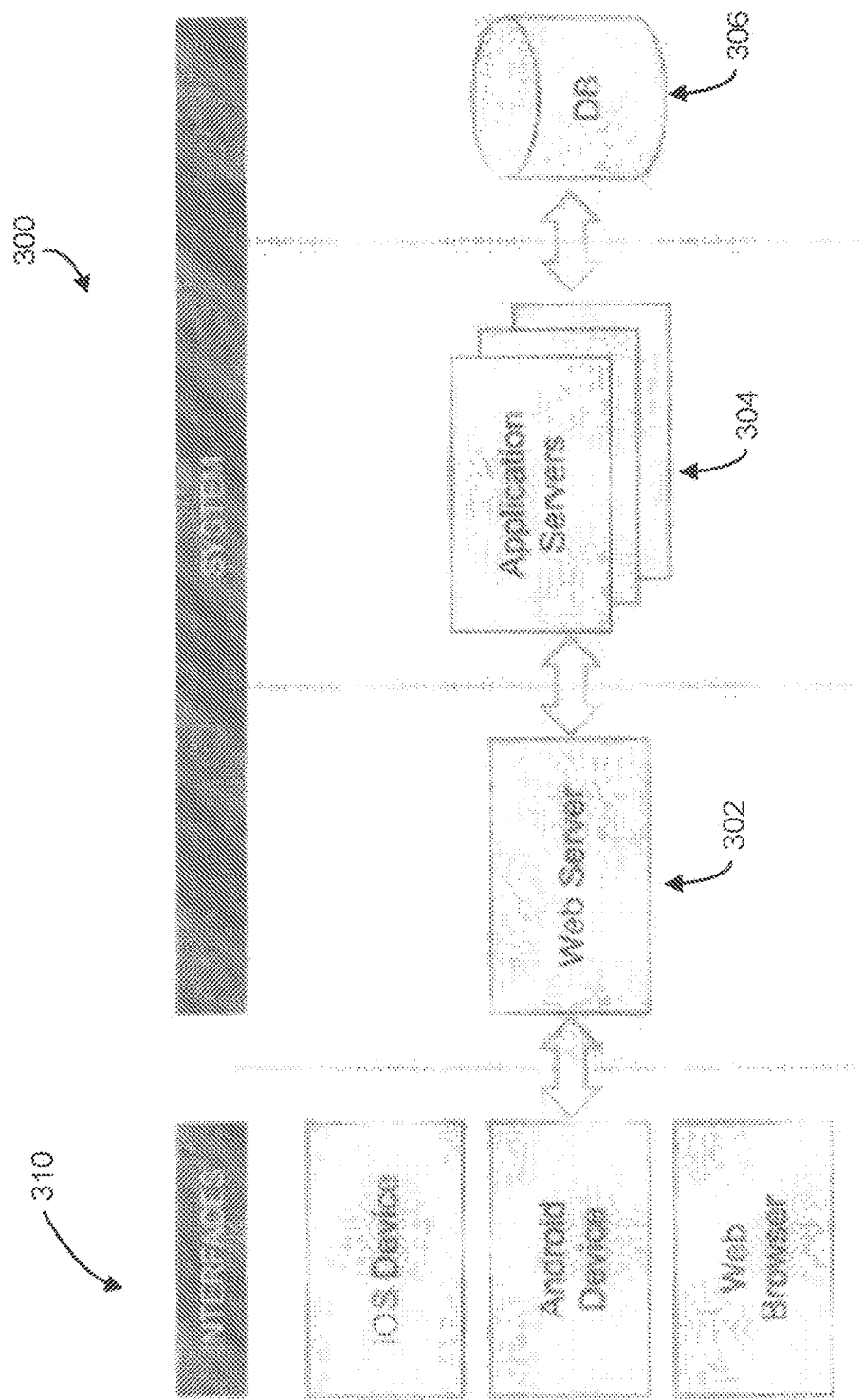
FIG. 3 is an illustration of another embodiment of the hair product selection system of the present disclosure.

In one embodiment, the hair product selection system 300 is shown in FIG. 3. As shown, the hair product selection system 300 can be similar to the hair product selection system 4 (FIG. 1) previously described. The hair product selection system 300 can be implemented on one or more web servers 302, one or more application servers 304 and one or more databases 306. The hair product selection 300 can operate to deliver content and functionality to interfaces 310. The interfaces can be implemented to display or otherwise communicate via browser, application or other user interfaces. The interfaces 310 can be used by customers and/or service providers to facilitate and improve the ability to provide hair products to customers. While not shown, the elements of the system 300 can communicate with each other and with customers and service providers via a communication network such as communication network 10 of FIG. 1 (e.g., the Internet).

In the embodiment of FIG. 3, the interfaces through which users interact with the system 300 can be configured to display via a browser or via an application operating on a suitable operating system. Desktops, laptops, tablets, smart phones, voice assistant and other suitable computing devices can be used to access the interfaces provided by or used by the system 300.

In one example, the system can include a mobile application that can be displayed on a smart phone. FIGS. 4-14 show example interfaces that can be implemented by the system 300. The interfaces can be downloaded as an application via the various application stores available for various operating platforms such as iOS and Android. In other examples, the interfaces can be made available via a traditional web browser. In still other examples, the interfaces can be made available as a cloud-based application residing on a remote server. In still other examples, other implementations can be used.

The hair product selection systems of the present disclosure can provide functionality between various stakeholders that operate in the hair or other cosmetic product industry. Such stakeholders can include product vendors, product retailers, service providers, business owners, stylists, technicians, designers, customers and the like. In one example, the hair selection system can provide functionality for stakeholders in the hair product industry such as providing products and services to customers in the nature of wigs, hair extensions, and related services. The present disclosure describes the use of the hair product selection system in the context of providing such hair products and services to customers. It should be appreciated, however, that the principles and teachings of the present disclosure can be extended to other environments, industries and other products and services. For example, the hair product selection system and the various elements thereof can be used in the healthcare industry, other cosmetic product industry, the fashion industry, and to other retail industries as well.

The hair product selection system can, for example, provide functionality to hair product designers, hair product vendors, hair product retailers, hair product service providers and to hair product customers. The hair product selection system can allow wig designers and manufacturers to make their products available for purchase through the system, to allow the vendors, the service providers and customers to interact and to communicate.

For purposes of the description below, the hair product selection system will be further described and reference is made to the stakeholders termed as operator, vendors, and customers. The term operator means the operator of the hair product system, namely the persons or organization with administrative rights to control, change, modify and improve the various elements of the hair product system in order to facilitate the transactions and experiences of the other stakeholders that interact with the hair product selection system. The term vendor means a person or organization that may seek to make hair products and/or hair product services available for purchase through the hair product selection system. A vendor may be a wig designer, manufacturer, wig cap manufacturer or other entity that offers hair products. Other types of vendors can include stylists, salon owners, retail stores, and the like. The vendors can use the services and functionality of the hair product selection system to improve their businesses and to offer new services to customers. The term customers means persons or organizations that desire to obtain hair products. Customers can use the hair product selection system to browse, search, view, review and purchase hair products.

Figure 4:
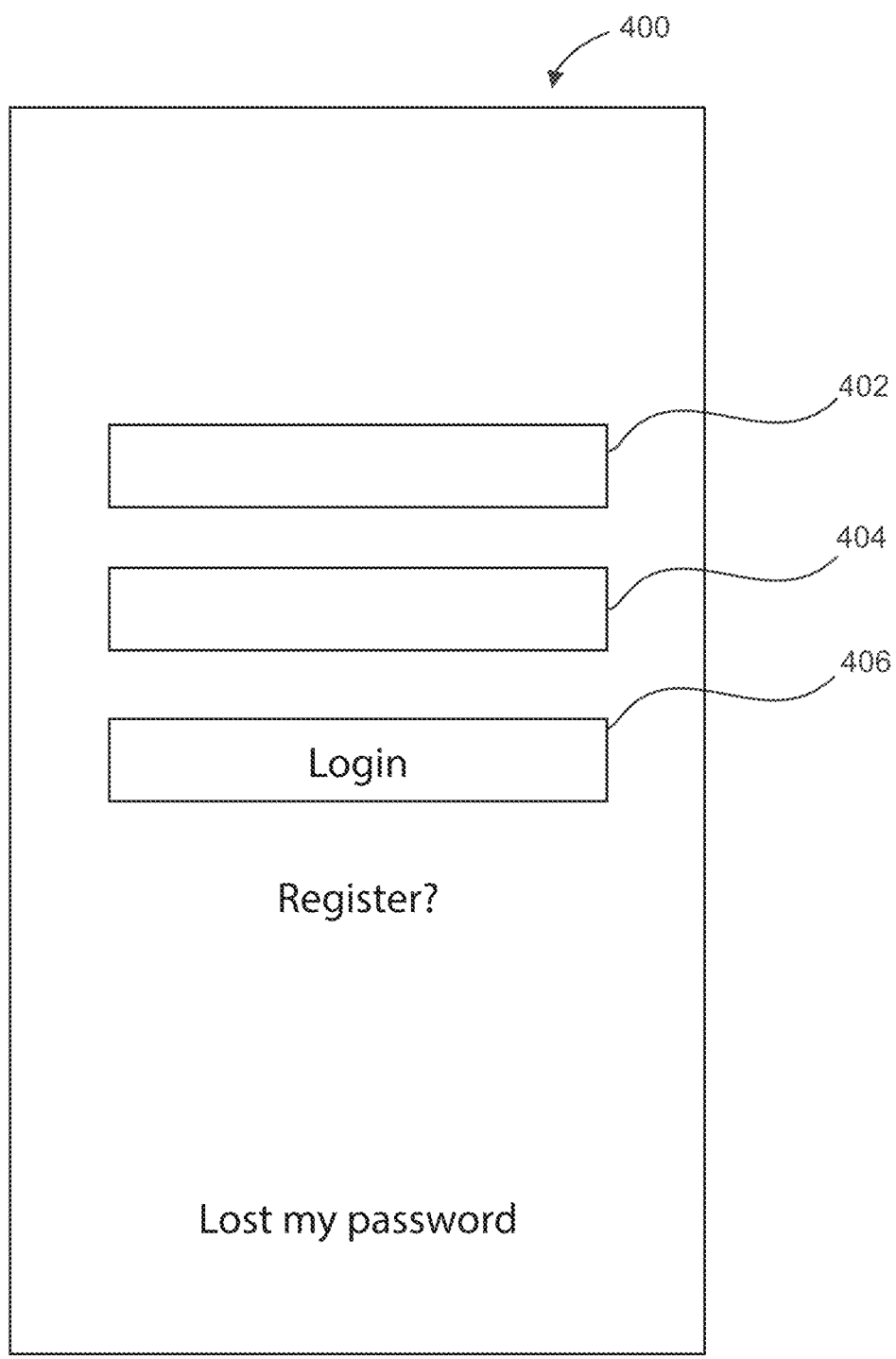
FIG. 4 is an illustration of an example login interface of the hair product selection system of the present disclosure.
Figure 5:
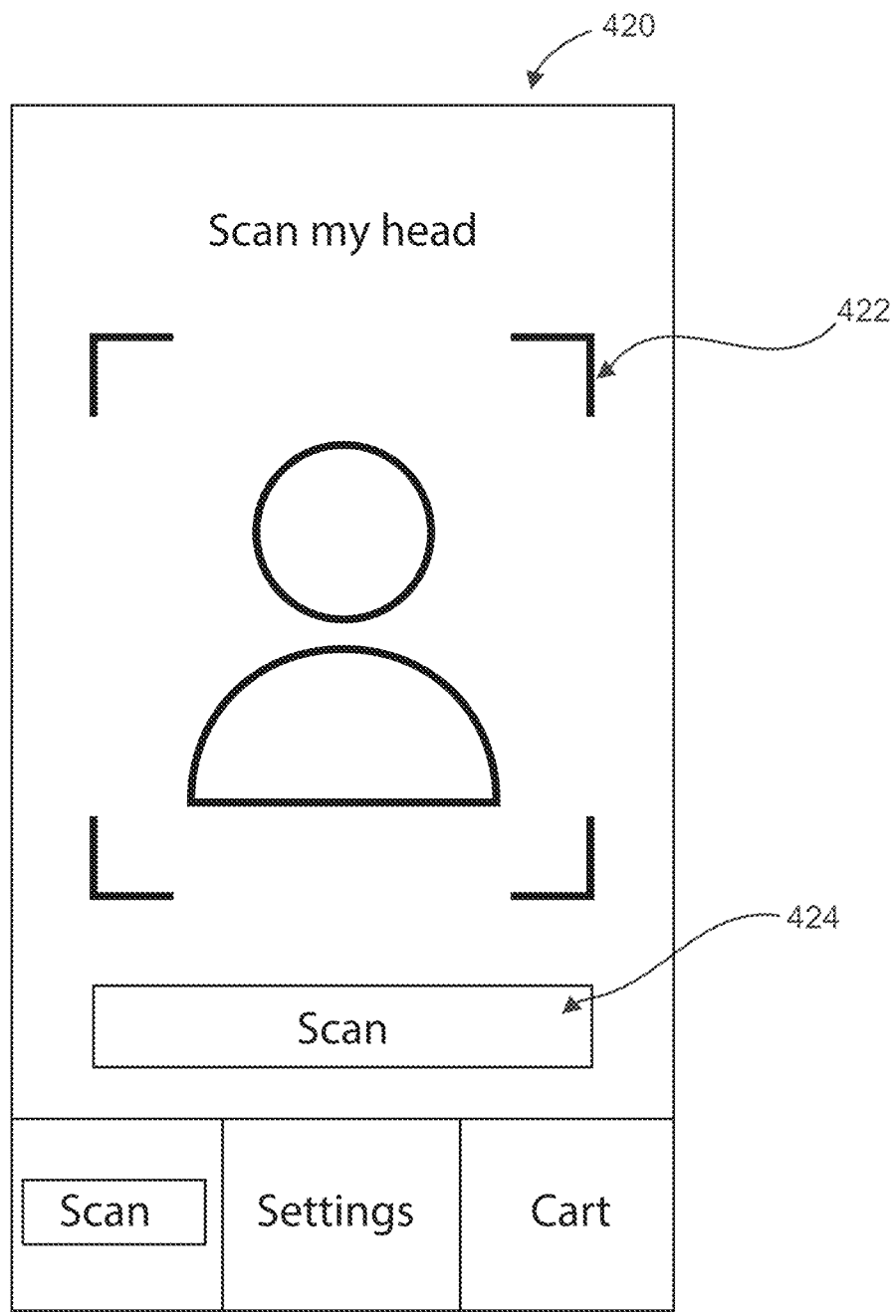
FIG. 5 is an illustration of an example customer scanning interface of the hair product selection system of the present disclosure.

FIG. 4 shows an example login interface 400 of the hair product selection system. The login interface 400 can be displayed, for example, by the hair product selector 6 previously described. The login interface 400 can include a first input field 402 and a second input field 404. As can be appreciated, a stakeholder can log into the functionality of the hair product selection system by entering login credentials in the first input field 402 and/or the second input field 404. The user interface 400 can include an actuation button 406 to allow the stakeholder to log into the hair product selection system after entering the login credentials into the input fields 402, 404 of the login interface 400.

Various vendors can become registered users of the hair product selection system into offer products and services to customers using the functionality of the hair product selection system. Various customers can also become registered users to access the system to purchase products or services. Upon registering as a user of the hair product selection system, a vendor can enter vendor characteristic information that can identify various aspects of the vendors business. Vendor characteristic information can include, for example, vendor name, vendor location, region served, types of services offered, types of products offered, and the like. Similarly, customers can also enter customer characteristic information upon registering as a user on the hair product selection system. Customer characteristic information can include, for example, customer name, customer preferences, customer address, payment information, product preferences, sizing information, and the like. The vendor characteristic information and the customer characteristic information can be stored in the database 12 or other storage device for later access by the hair product selector 6.

Once registered and logged into the hair product selection system, a customer can access the various functions of the system to browse, select, view, try-on, and otherwise interact with the hair products that may be available via the system. One aspect, is a try-on and view feature of the system that will be further described below. In order to access the augmented reality and virtual try-on features of the hair product selection system, the customer can provide sizing information that can be assisted by customer sizing upload features or customer measuring features. One such customer measuring feature can be implemented in the customer scanning interface 420 shown in FIG. 5. The customer scanning interface 420 can include a customer image window 422 and a scan initiation button 424. In instances in which the customer scanning interface 420 is implemented on a smart phone.

The hair product selection system can access and use the camera and/or cameras on the smartphone to take images of the customer. The hair product selection system can use such images to construct a three-dimensional model of the customer's features such as of the customer's head. In many instances with modern smart phones, the camera and the software used in connection with the camera can be used to automatically construct a three-dimensional model using hardware and software included on the smart phone. Such data and three-dimensional model data can be sent to the hair product selection system and stored in the database 12 or other storage device. The three dimensional model of the customer's head or other features can be used by vendors to measure various aspects of the customer's head for the sizing and fitting of hair products that may be ordered or purchased by the customer.

In other instances, a customer may be accessing the hair product selection system via a desktop computer or via an older smart phone that does not have the embedded hardware or software to automatically construct the three dimensional model of the customer's head or other features. In these types of instances, and as will be further described below, the hair product selection system can include a measurement engine 1522 (FIG. 15) that can be used to create the three dimensional model of the customer's head or other feature. In such instances, the customer scanning interface 420 can be used to capture one or more customer images that can be used by the measurement engine 1522 to construct the three dimensional model.

In order to scan and/or capture images, the customer can use the customer scanning interface 420 by allowing access to the camera in the customer's smart phone and then positioning the customer's head (or other feature) in the customer image window 422 and pushing or touching the scan initiation button 424. The customer scan or customer image can be then captured and stored locally or remotely by the hair product selection system. The customer scanning interface 420 can also include other functionality such as allowing access to settings or to the customer's virtual as shown.

Figure 6:
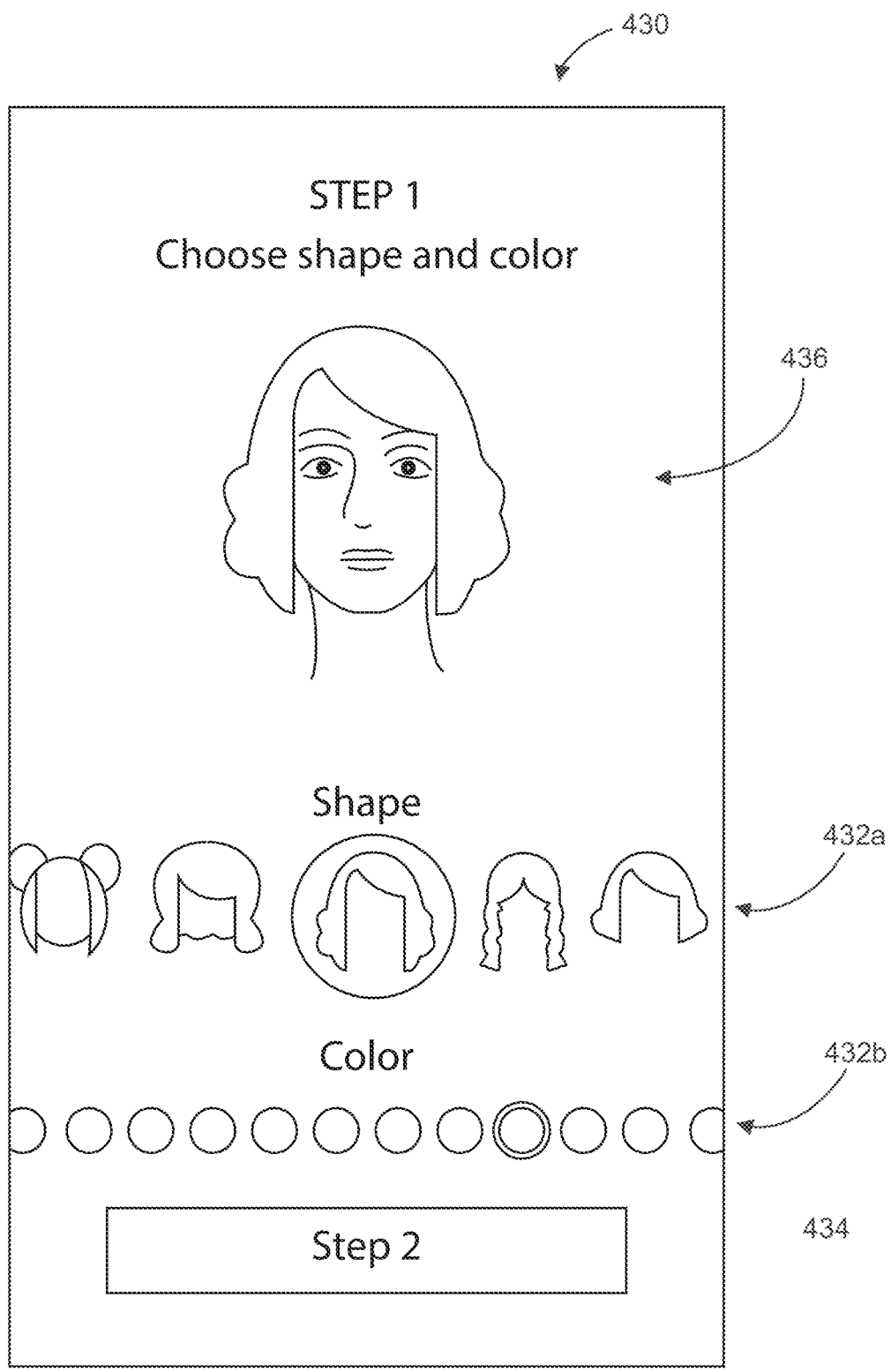
FIG. 6 is an illustration of an example hair product selection interface of the hair product selection system of the present disclosure.

As shown in FIG. 6, the hair product selection system can include a hair product selection interface 430. The hair product selection interface 430 can allow a customer to select and browse various hair products that may be available via the hair product selection system. In the example shown, the hair product selection interface can include one or more hair product characteristics 432a and 432b. In this example, the hair product characteristic 432a is wig shape and hair product characteristic 432b is wig color. In other examples, other hair product characteristics can be used such as cost, size, length, style, type, or the like. As the customer selects a hair product characteristic, a sample hair product can be displayed on the customer in customer display 436. In the example of FIG. 6, the image shown displays an overlay of the hair product or wig on an image of the customer.

In other examples, the customer display 436 can include a three dimensional rendering of the customer with the hair product or wig. In still other examples, the customer display can include an augmented reality view in which the hair product or wig can be displayed on the customer. In various examples, the customer display 436 can allow the customer to view the hair product being worn by the customer before purchase. The customer display 436 can allow the customer to rotate the view of the product on the customer to present a realistic view of the product being worn.

In still other examples (not shown), the hair product characteristics can be dynamically changed and viewed in the customer display 436. For example, a hair length or color can be changed dynamically rather than be selected from predetermined choices. When a customer is satisfied with a product choice, the customer can select the selection button 434 to choose a selected hair product and move to the next step in the purchase process.

Figure 7:
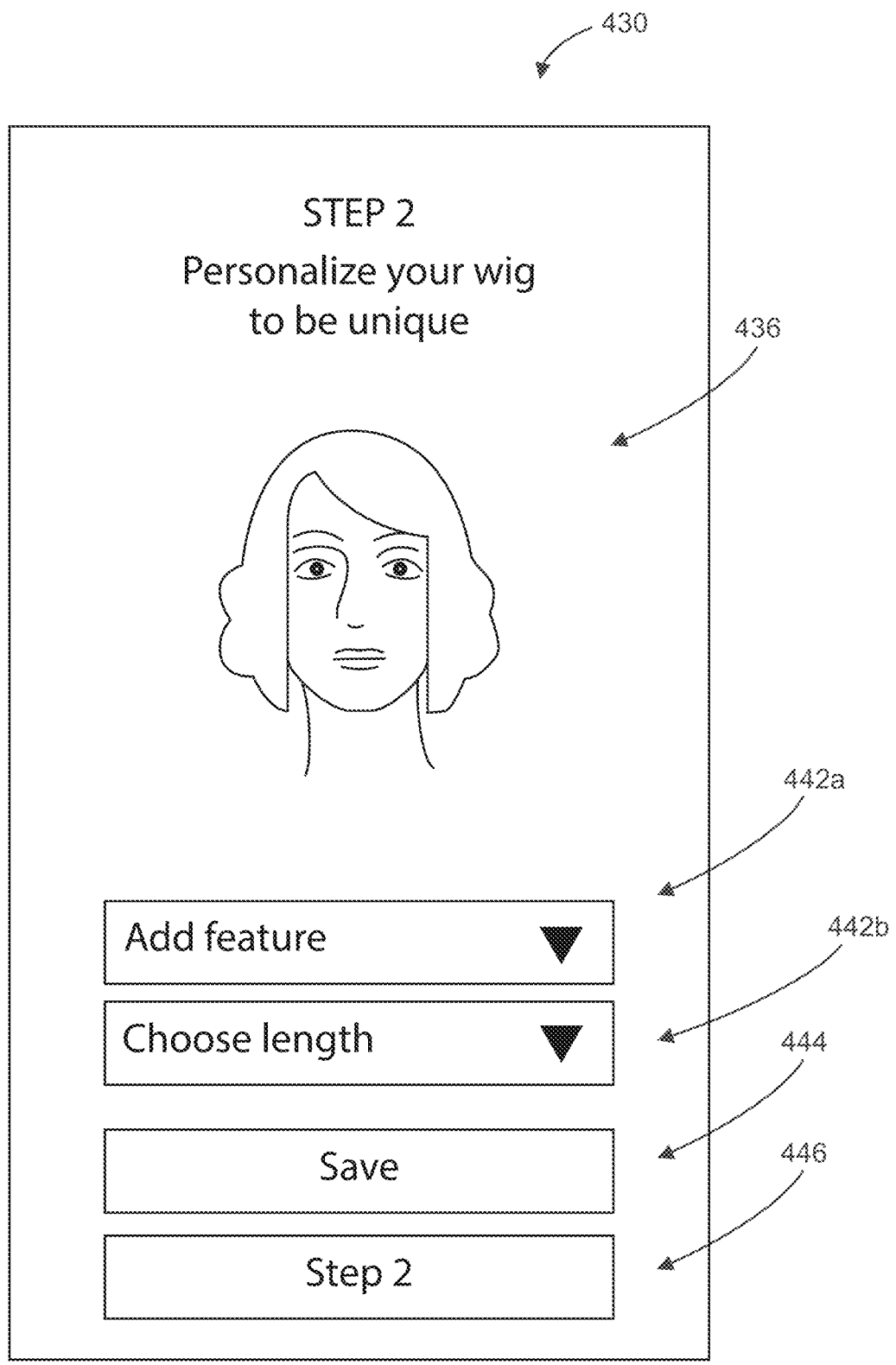
FIG. 7 is an illustration of an example customization interface of the hair product selection system of the present disclosure.

As shown in FIG. 7, the hair product selection system can also include a customization interface 440. The customization interface 440 can allow a customer to add, modify or otherwise customize a hair product or wig. The customization interface can include the customer display 436 previously described that can update or change when the customer makes customization selections. The customization interface 440 can include one or more product customizations 442a, 442b. The product customizations can include further characteristics to hair products or other additions, modifications or variations such as highlights, curls, colors, length, size, etc. The customization interface 440 can also include a save button 444 that can store information about the selected and customized hair product or wig for later use. The customization interface 440 can also include a purchase button 446 that can cause the selected and customized hair product or wig to be placed in the customer's virtual cart for purchase.

Figure 8:
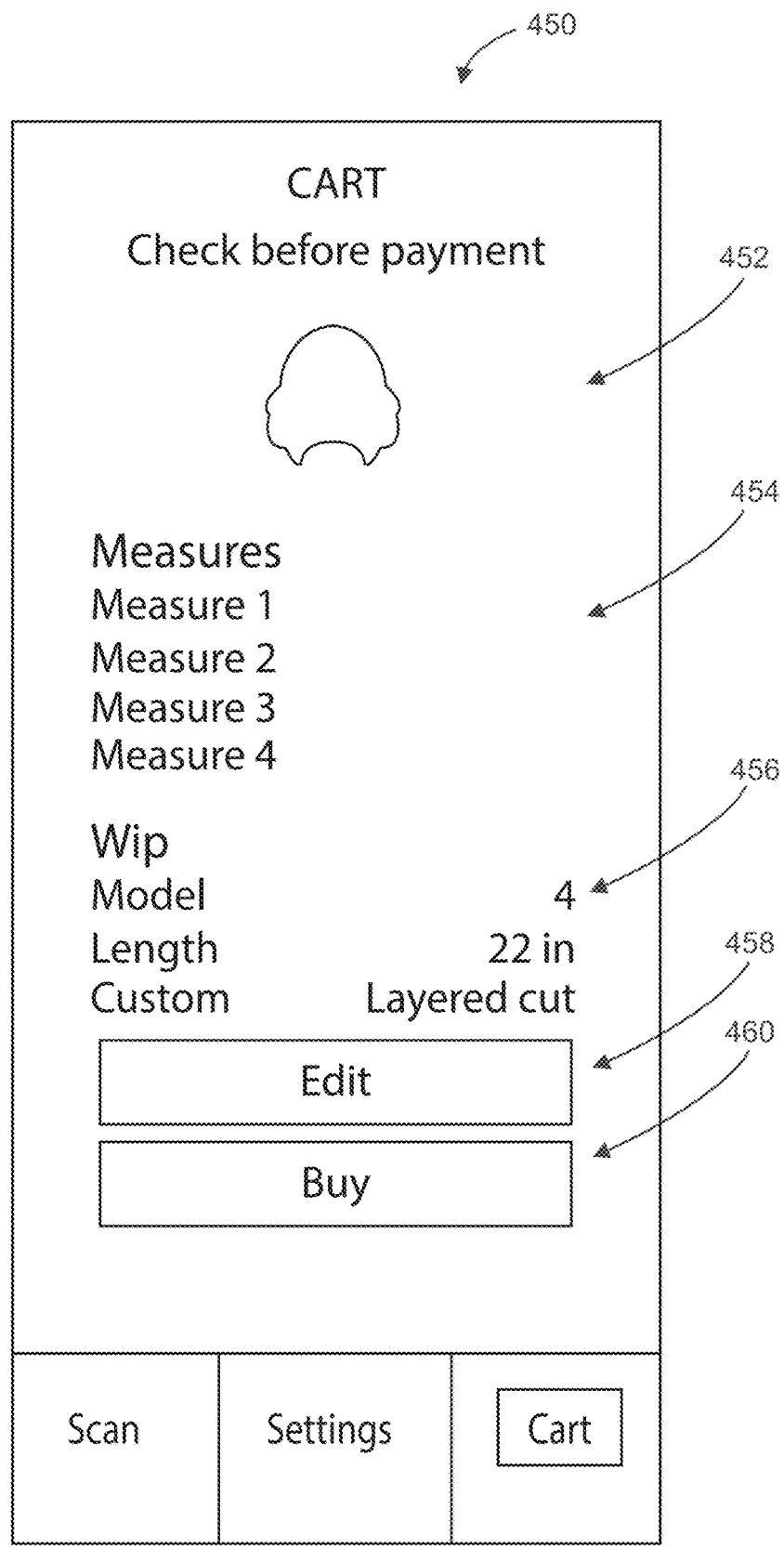
FIG. 8 is an illustration of an example virtual cart interface of the hair product selection system of the present disclosure.

Referring now to FIG. 8, a virtual cart interface 450 is shown. The virtual cart interface 450 can allow a customer to interact with the hair product selection system to purchase a hair product (such as a wig). The virtual cart interface 450 can include an image 452 of the product to be purchased. The virtual cart interface 450 can also include one or more customer measurements 454 that can list one or more measurements of the customer to define the size, shape or other characteristics of the customer. In the context of a wig, the customer measurement 454 can include various measurements of the customer's head such as circumference, ear to ear measurement, height of head or the like. For other products, other measurements can be included. The virtual cart interface can also include finalized characteristics 456 of the hair product that have been selected or customized by the customer during previous interactions. When the customer is satisfied with the hair product to be purchased, the customer can select the buy button 460. If revisions, additions, deletions or other modifications need to be made, the customer can select the edit button 458 to change the various aspects of the hair product.

Figure 9:
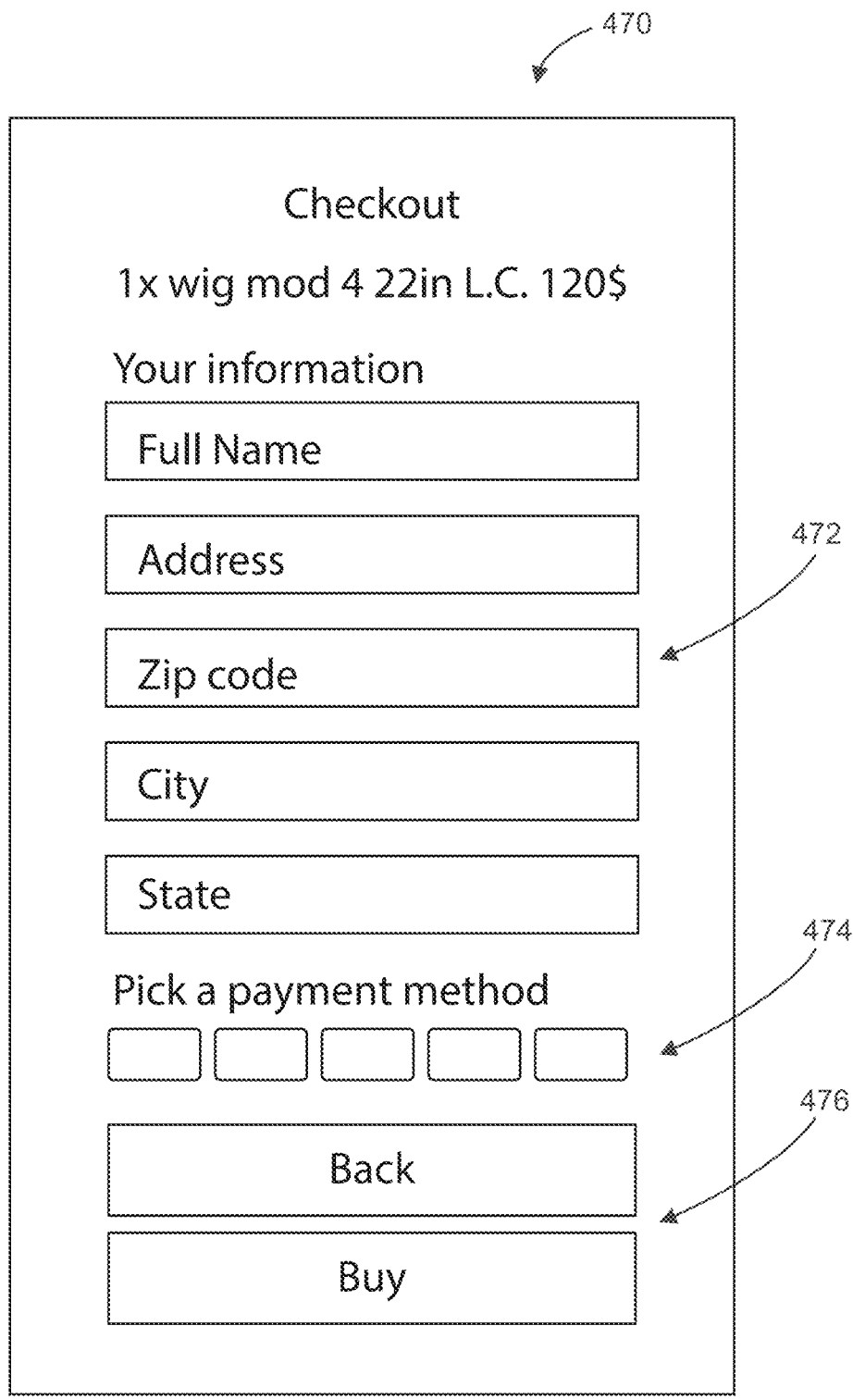
FIG. 9 is an illustration of an example checkout interface of the hair product selection system of the present disclosure.

Upon selecting the buy button 460, the hair product selection system can display the checkout interface 470. An example is shown in FIG. 9. The checkout interface 470 can include customer purchase information 472 that describes things such as a customer's address. The interface 470 can also include payment information 474 and navigation buttons 476 to either go back to revise information or to buy the selected hair product.

Figure 10:
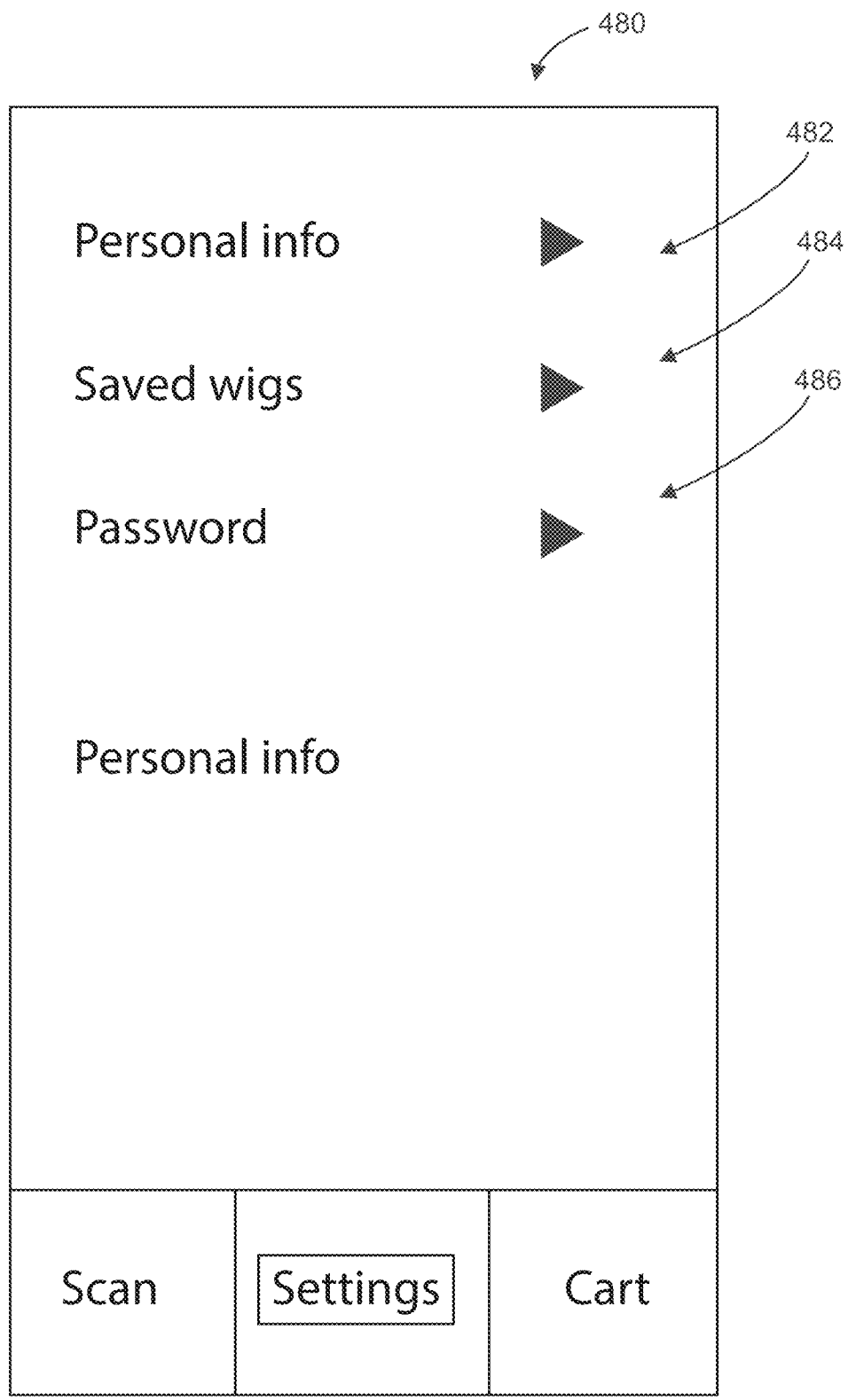
FIG. 10 is an illustration of an example settings interface of the hair product selection system of the present disclosure.

As shown in FIG. 10, the hair product selection system can also include a settings interface 480. The settings interface can allow a user to provide or update information regarding the user or regarding the user's interactions with the hair product selection system. For example, the setting interface 480 can include a personal information interface 482, a saved products interface 484 and a login setting interface 486. The personal information interface 482 can allow the user to display and edit personal information such as address, name, payment information, contact information and the like. The saved products interface 484 can include information regarding hair products that the customer has stored during browsing and/or selection of hair products. The login setting interface 486 can allow a user to display and edit login information such as password, username and the like.

Figure 11:
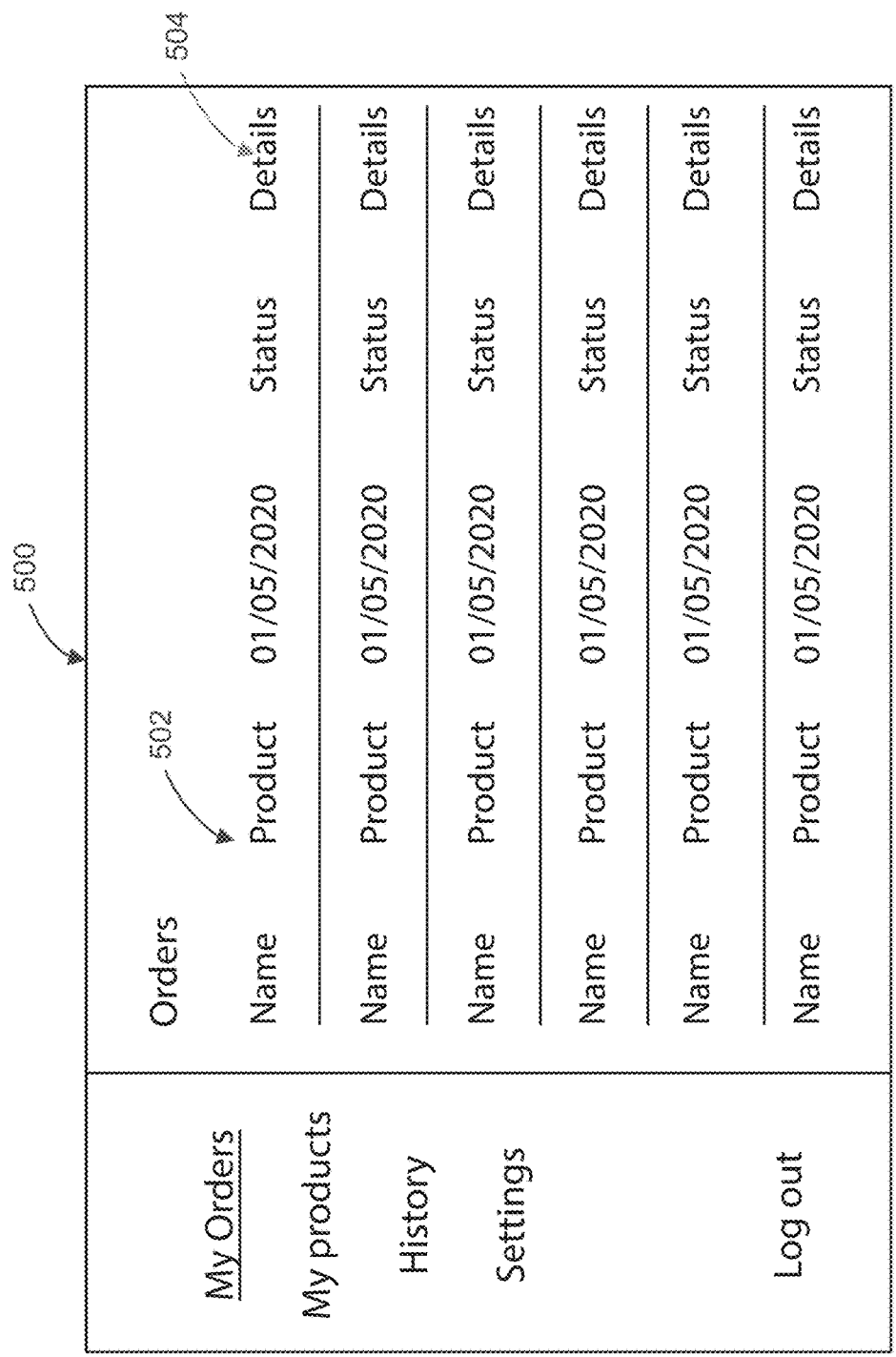
FIG. 11 is an illustration of an example order interface of the hair product selection system of the present disclosure.
Figure 12:
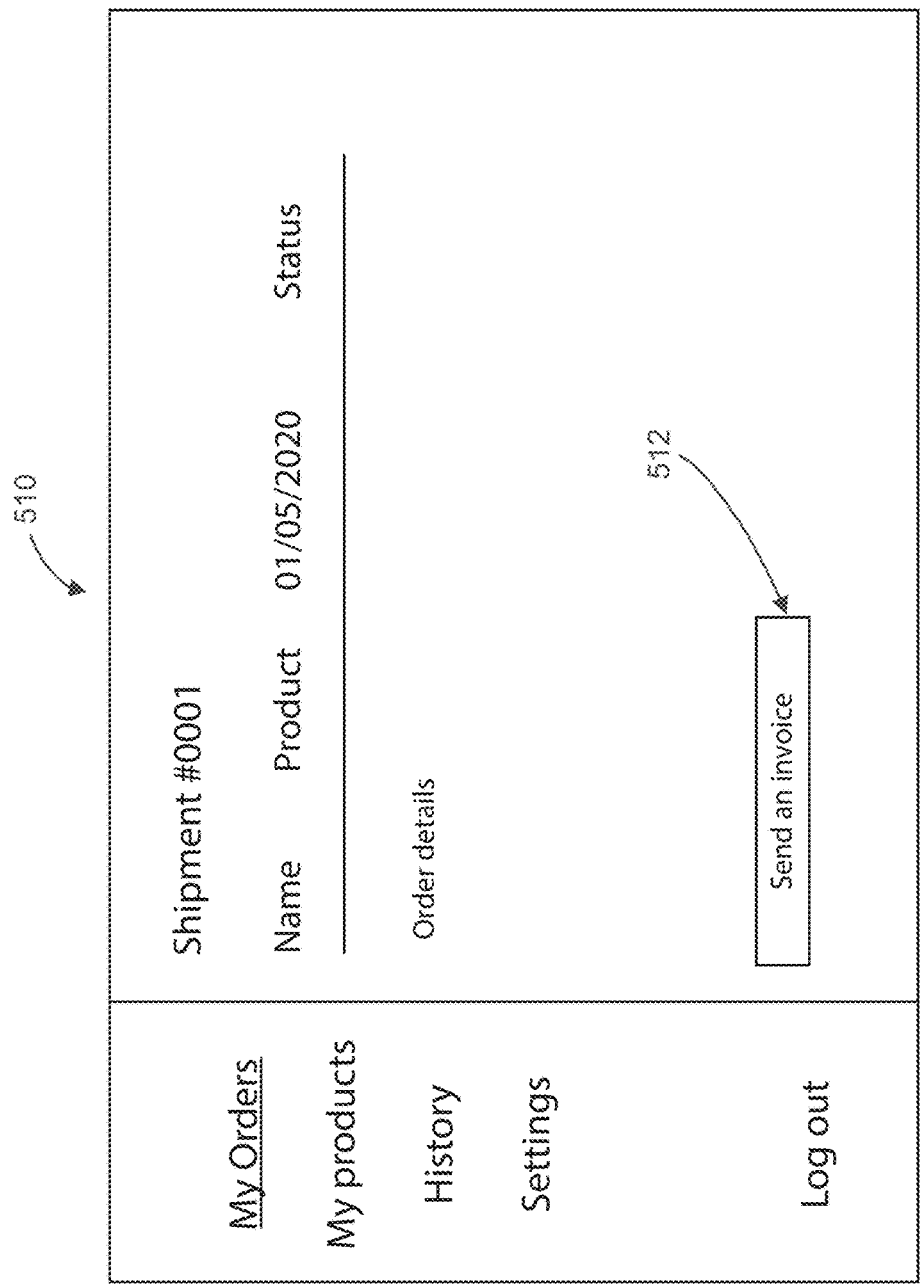
FIG. 12 is an illustration of an example order detail interface of the hair product selection system of the present disclosure.

Referring now to FIG. 11, an order interface 500 of the hair product selection system is shown. The order interface 500 can allow the user to view a list of ordered products 502. The list 502 can include information regarding each order such as an order name, a product in the order, date of the order, status of the order and the like. Each of item of information can be viewed in greater detail by the user as well.

For example, if a user desires more detailed information, the user can select the order detail button 504. Upon such selection, the hair product selection system can display an order detail interface 510. The order detail interface 510 can display various elements of information regarding an order such as order number, order name, products in the order, date of the order, a current status of the order and the like. In addition, if the user is a service provider or retailer, the order detail interface 510 can include an invoicing button 512. The invoicing button, when selected by the user, can cause an invoice to be automatically created that can be used to collect payment for the order. The invoice can include the order details described above and can be automatically sent to the customer via email or via the hair product selection system.

Figure 13:
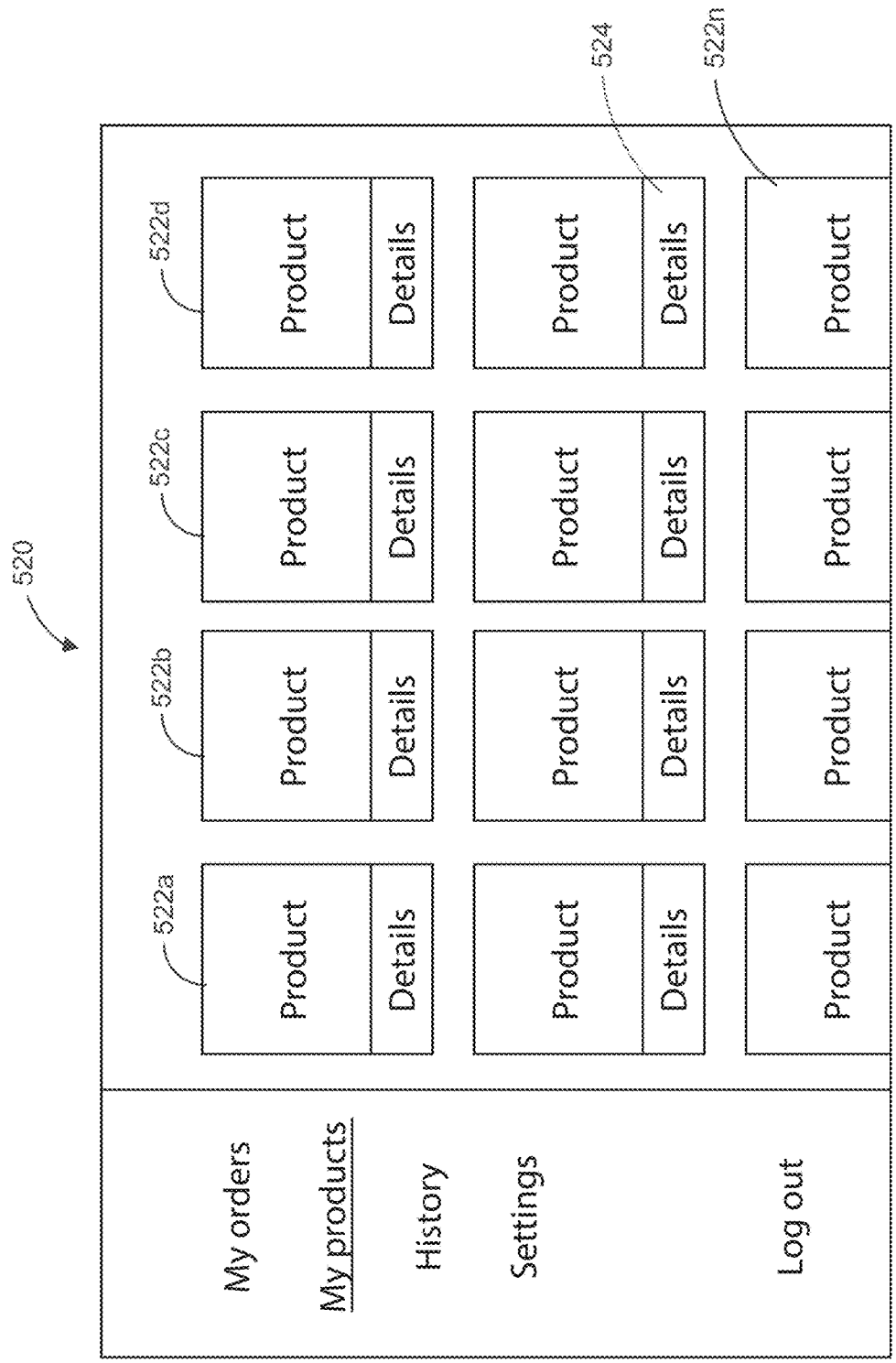
FIG. 13 is an illustration of an example product listing interface of the hair product selection system of the present disclosure.

Referring now to FIG. 13, the hair product selection system can also include and display a product listing interface 520. The product listing interface 520 can include one or more product indicators 522a-522n. The product indicators 522 can each show one or more products that are available for purchase on the hair product selection system. The product indicators can include an image of the product, name of the product or other identifying information about products. The product indicators 522 can be products that have been saved as favorites or preferences by a user or can be recommended or otherwise identified as products that a user may be interested in. Each of the product indicators 522 can also include a product detail button 524. When selected by a user, the product detail button 524 can cause a product detail interface to be displayed. The product detail interface can include more detailed information about the product and other functionality such as to allow the product to be added, edited or otherwise modified in the hair product selection system.

Figure 14:
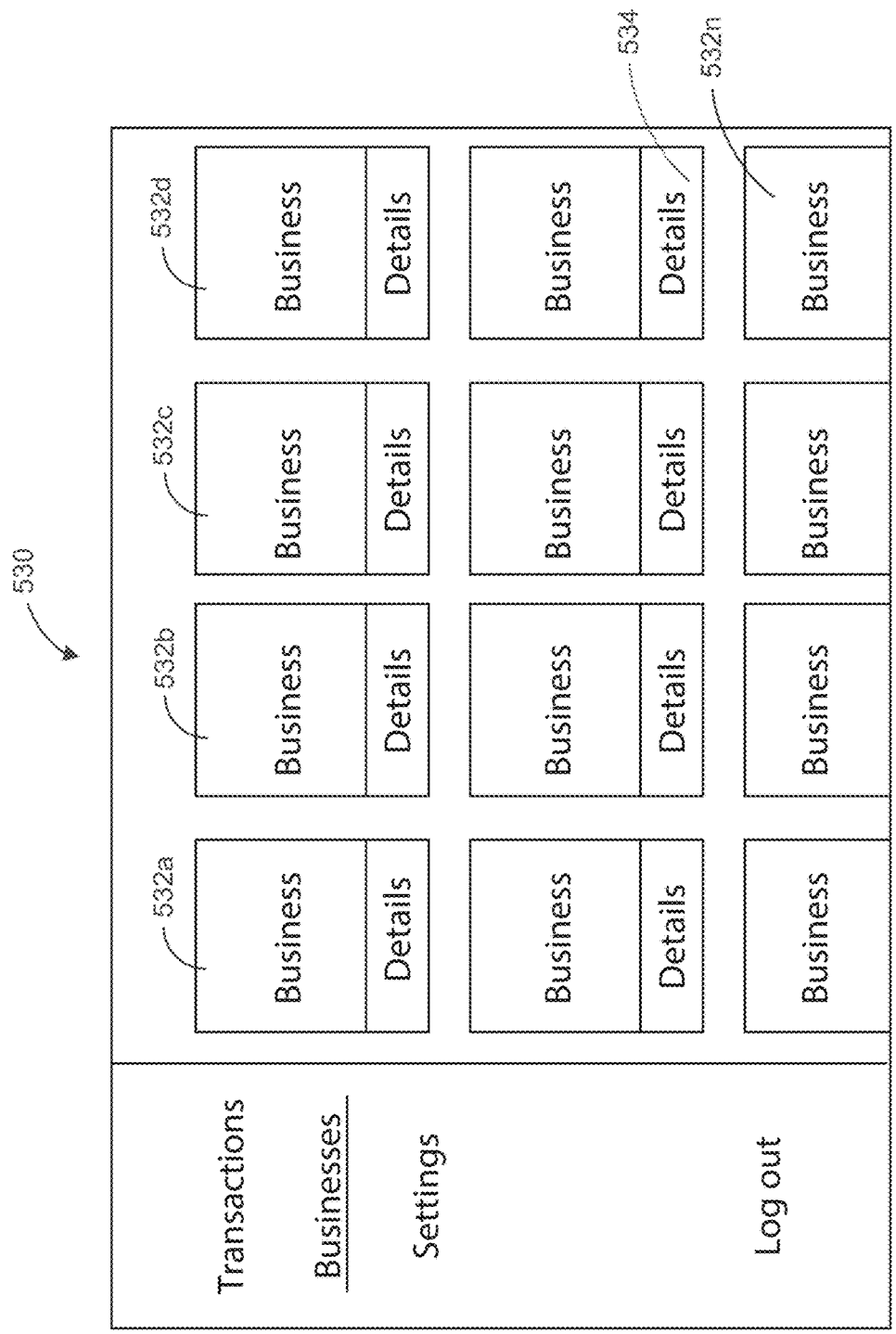
FIG. 14 is an illustration of an example business listing interface of the hair product selection system of the present disclosure.

Referring now to FIG. 14, the hair product selection system can include a business listing interface 530. The business listing interface 530 can include a listing of one or more business identifiers 532a to 532n. The business listing interface 530 can include information regarding the various business, vendors, retailers, service providers or other persons or organizations that may have accounts or be registered users of the hair product selection system. Each business identifier 522 can various elements of information regarding the business or other organization that may be a registered user of the hair product selection system such as, name, address, contact information, length of affiliation with the hair product selection system, payment or other financial information, services offered, products offered, and the like. The business listing interface 530 can also include a business detail button 534 for each business in the business listing interface 530. When the business detail button 534 for the business is selected by a user, additional or more detailed information can be displayed via a business detail interface.

The various stakeholders of the hair product selection system can perform various actions that are assisted, facilitated and/or caused by the hair product selection system. Customers of the hair product selection system can register an account and input, edit and store personal information including login information, preferences, contact information, payment information and the like. The customers can view, select, customize and order various hair products, wigs or other products. The customers can view images of the products and view the products worn by the customer. To facilitate such functionality, customers can upload images and measurement information as well use the hair product selection system to scan and/or automatically measure the customer's head or other features. The hair product selection system can also be linked to a customer's social media accounts to allow the customer to share or send images of the customer wearing various products using the virtual try-on features of the hair product selection system.

Vendors (e.g., retailers, service providers, salons, etc.) also can perform various actions that are assisted, facilitated and/or caused by the hair product selection system. Vendors of the hair product selection system can register an account and input, edit and store vendor information including login information, preferences, contact information, payment information and the like. Vendors can also upload or otherwise input information regarding products and services that a vendor may offer for purchase. The information can include product information, cost, specifications, product images and the like. Vendors can also see listings of orders that customers may have placed on the system and can manage the orders. Vendors can view the specifications and customizations that customers may have requested for the wigs or other products. Vendors can also send invoices for purchased products atomically to customers using the system. Vendors can also automatically print shipping labels for orders and see listing of all shipments and other transactions.

The operator of the hair product system can also perform various actions that are assisted, facilitated and/or caused by the hair product selection system. The operator can review and/or permit new vendors and/or customers to register on the hair product selection system. The operator can also have "super" administrative rights to update, change or otherwise modify the information on the hair product selection system such as customer information, vendor information, product information, and the like. The operator can view, filter and interact with all transactions that may be placed or executed by the hair product selection system including orders, purchases and communications between users. The operator can also collect data and other information regarding the actions by users on the hair product selection system. Such data and other information may be used, for example, to improve the models or other algorithms used by the hair product selection system to provide measurements, recommendations and other functionality.

In still other embodiments of the hair product selection system, the system can provide other functionality and interfaces to provide such functionality. Example further functionality can include the ability to view, browse, filter and search for stylists rather than by product. For example, a customer can search and purchase services from a particular stylist that may be a registered user of the hair product selection system. The hair product selection system can also provide a calendar interface to allow a customer and/or a vendor to upload scheduling information and allow a customer to schedule an appointment with a stylist or a salon. Such appointments can be conducted via the hair product selection system that can provide online or internet-based video chat, text chats and other meeting formats.

Still other examples can allow a customer to search, upload and select photos or other descriptive information for hair styles or wig types or other stylistic information. The hair product selection system can then recommend or identify stylists, salons or other vendors that match the preferences of the customer. Still other examples can provide notifications of all portions or all stages of the hair product selection process including when an order is sent, when an order is received, when an order is completed, when a hair product is shipped or when appointments are conducted or scheduled.

Still other features and functionality of the hair product selection systems of the present disclosure can include to allow hair product photos and virtual try-ons to be shared via social media or other communication tools. The hair product selection system can also allow stakeholder to provide reviews of vendors and can also allow vendor to provide reviews of customers. Still other examples can include informational and educational information via podcasts, articles, blogs and other communication streams.

Figure 15:
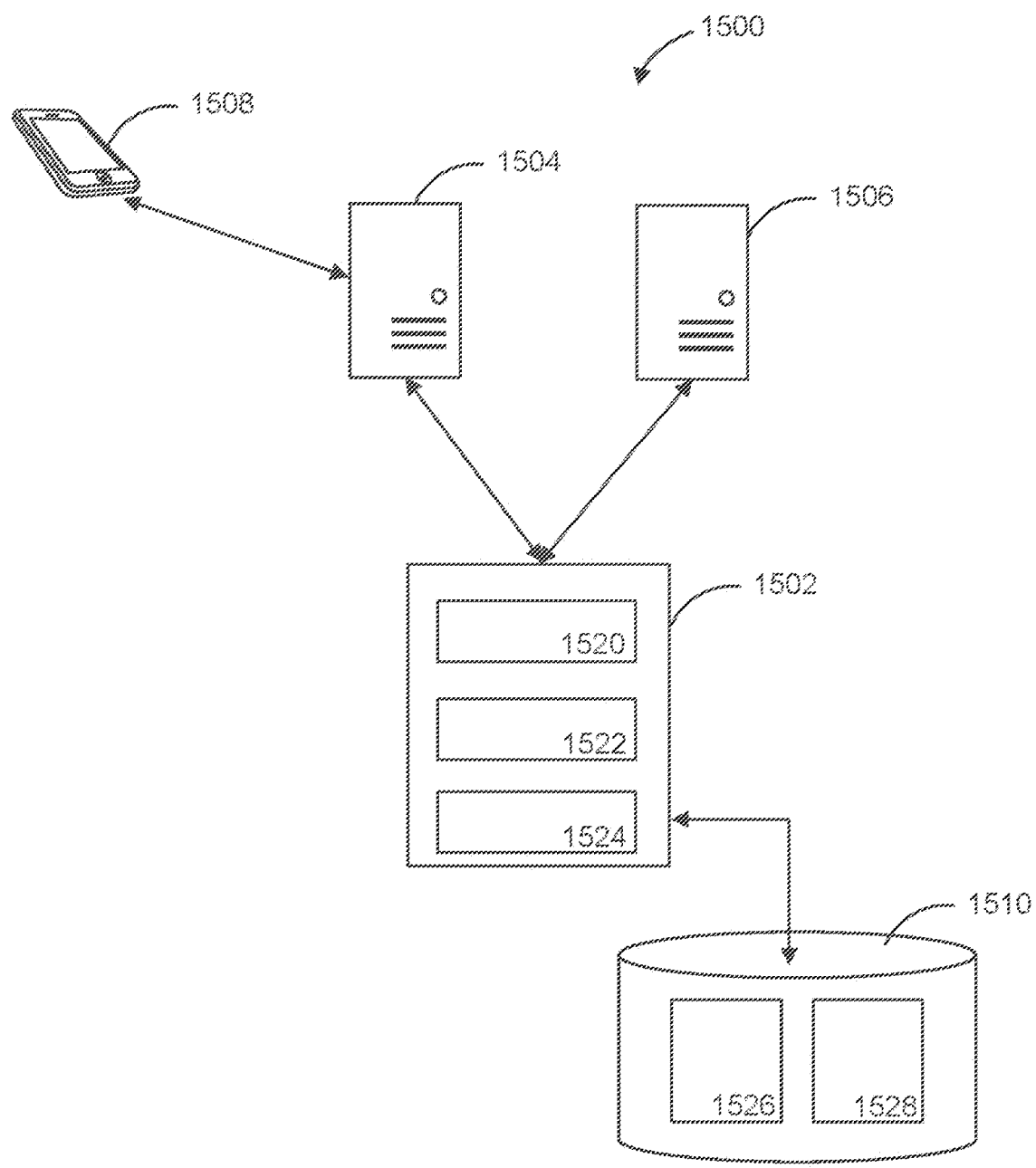
FIG. 15 is an illustration of another embodiment of the hair product selection system of the present disclosure.

Referring now to FIG. 15, another embodiment of a hair product selection system 1500 is shown. The hair product selection system 1500 can provide the functionality as previously described. The hair product selection system 1500 may include a hair product selector 1502, an application server 1504, and a database 1510. The hair product selector 1502, the application server 1504 and the database 1510 can be similar to the hair product selector 6 and the database 12 previously described and have the elements described with respect to the computing device 200. The application servicer 1504 can also have the elements of computing device 200 previously described and can configured to host and/or enable the display of a website or application for display and interaction by a customer computing device 1508. The customer computing device 1508 can be similar to the mobile computing device 5 previously described.

As also shown, a vendor computing device 1506 can also be configured to interact with the hair product selection system 1500. The elements shown in FIG. 15 can be connected via a network 10 as previously described.

The hair product selector 1502 can include a data acquisition engine 1520, a measurement engine 1522 and a try-on engine 1524. The data acquisition engine 1520 can allow the hair product selector 1502 to obtain information or data that may be needed to perform various functions. The data acquisition engine 1520 can include various application protocol interfaces (APIs) or the like to allow the hair product selector to obtain information or data from the application service 1504, the customer computing device 1508, the vendor computing device 1506 or the database 1510.

The measurement engine 1522 can enable the hair product selection system 1500 to obtain various measurements of a customer's head or other feature. In one example, the measurement engine 1522 can use the embedded functionality of the customer computing device 1508 to obtain a three dimensional model of the customer's head or other feature using the camera and associated software and hardware of the customer computing device 1508. The three dimensional model can then be obtained by the measurement engine 1522 and used to measure various aspects of the customer's head or other feature such as circumference, width, or other measurement that may be used to produce a wig or other hair product.

In other examples, the measurement engine 1522 can obtain two-dimensional images of the customer and then use the images of the customer to build a three dimensional model of the customer's head or other feature. This aspect of the measurement engine 1522 can be particularly advantageous in instances in which the customer computing device 1508 does not have embedded hardware or software that can automatically construct a three dimensional model using the camera and other hardware/software. Older models of smart phones, for example, may not have such functionality embedded in the smartphone. Because the measurement engine 1522 can still build three dimensional models using only two-dimensional images, this enables most customers (regardless of the age of the smartphone or other computing device) to use the hair product selection system 1500 to order wigs and other hair products.

The measurement engine 1522 can, for example, include a machine learning model that can automatically build a three dimensional model of a customer's head using two dimensional images. The machine learning model can use historical images of customers to train the machine learning model in a supervised setting to build the three dimensional models. For example, the historical image data can include images of the customer (typically, at least two orthogonal images as will be further described) and associated feature measurement data. This training data can then be used to train the machine learning model and verify the accuracy of the automatically generated three dimensional models against the feature measurement data. Any suitable machine learning library, open source software or proprietary software can be used to build the model.

In another example, the measurement engine 1522 can allow the operator of the hair product selector to build the three dimensional model of the customer's head or other feature. The measurement engine 1522 can obtain customer images and/or customer data regarding the customer's head or other feature. The measurement engine 1522 can then allow the operator or the vendor to use the customer images and/or customer data to build the three dimensional model. The operator or the vendor can use a builder interface to build the three dimensional model.

Figure 18:
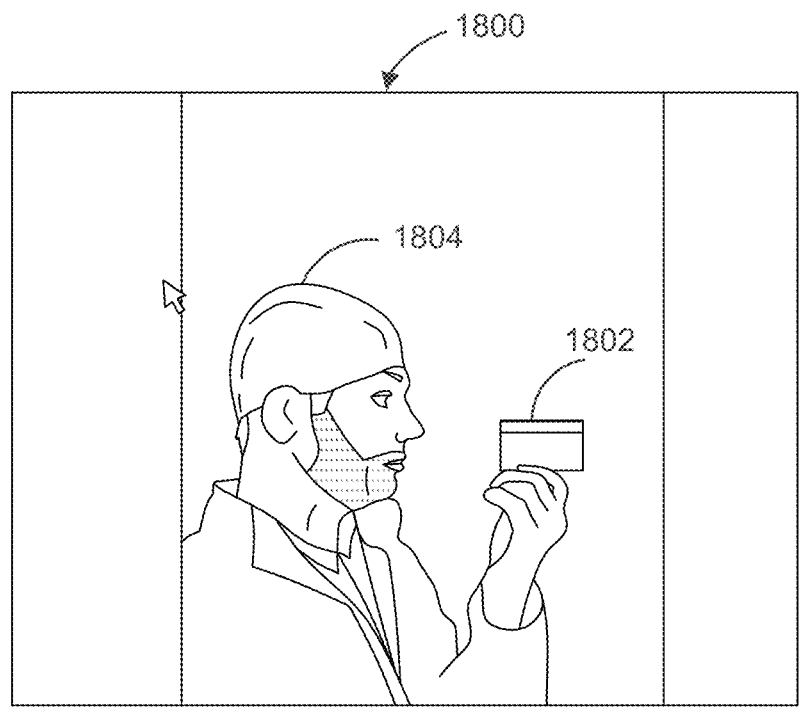
FIG. 18 is an illustration of an example customer image that can be used by a measuring engine of the present disclosure.
Figure 19:
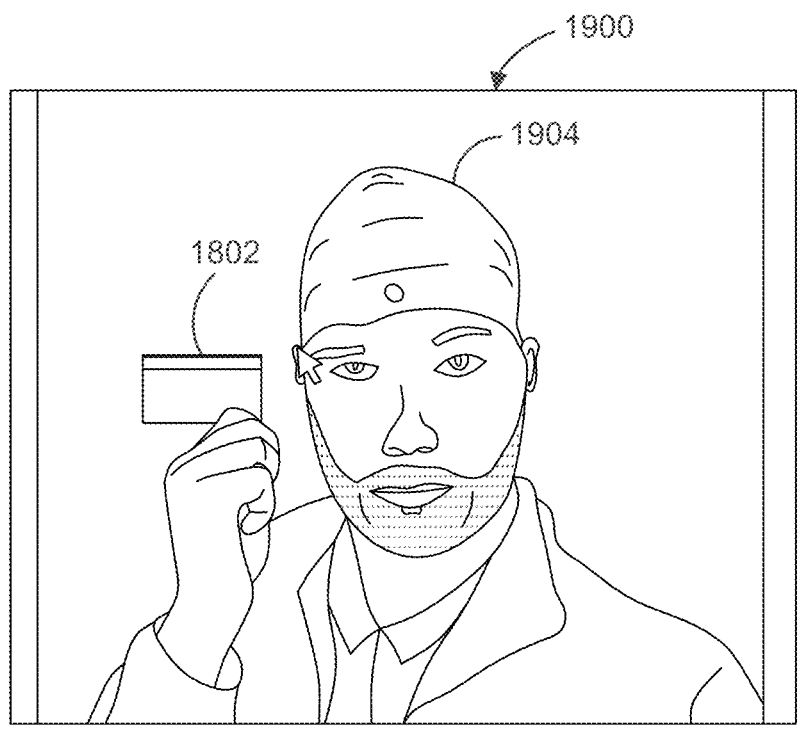
FIG. 19 is an illustration of another example customer image that can be used by a measuring engine of the present disclosure.

In one example, the measurement engine 1522 can obtain customer image data such as two orthogonal images of the customer. As shown in FIGS. 18 and 19, the two orthogonal images can include a side or profile image 1800 (FIG. 18) and a front image 1900 (FIG. 1900). In the profile image 1800, the customer 1804 can use the camera on his/her computing device to take a profile picture. The customer can include a measurement indicator 1802. The measurement indicator 1802 can be an object of known size that the customer includes in the profile image 1800. The measurement indicator 1802 in the example shown is a credit card but other objects can also be used such as a ruler, business card, pen, envelope, paper clip, or other object of known size. The front image 1900 an include a front view of the customer 1904 and also include the measurement indicator 1802. It is preferable that the profile image 1800 and the front image 1900 have a contrasting background so that the outline of the customer can be seen against the background. In addition, it can be useful for the customer to wear a cap (e.g., wig cap, swimming cap, skull cap, etc.) over the hair so that the outline of the customer's head can be seen. In other examples, the measurement engine 1522 can use other images other a side and front orthogonal views.

Figure 20:
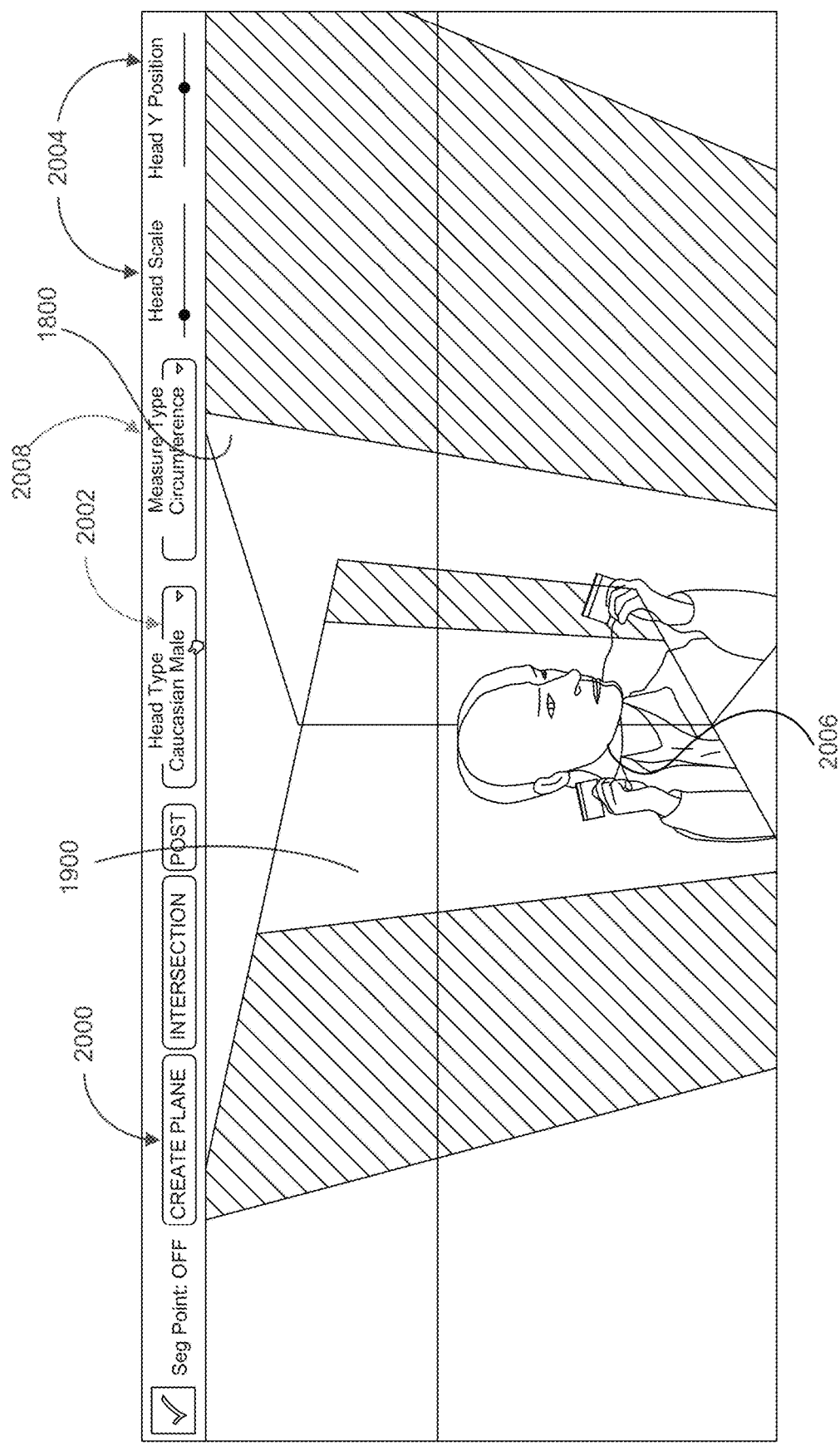
FIG. 20 is an illustration of an example builder interface of the hair product selection system of the present disclosure.

The hair selector 1502 can obtain the profile image 1800 and the front image 1900 and display the profile image 1800 and the front image 1900 in a builder interface 2000 (FIG. 20). The measurement engine 1522 can align the profile image 1800 and the front image 1900 so that the customer's head is aligned in the two views. The builder interface 2000 can be manipulated and interacted with by a user, such as by an employee of the operator or of a vendor. The operator can move the displayed images in the builder interface 2000 to zoom in or out, to rotate or to translate the images on the screen of the user.

The builder interface 2000, in the example shown, includes a feature shell selector 2002. In this instance, the feature shell selector 2002 allows a user to select one of various feature shells to be displayed on the builder interface 2000. A feature shell is a predefined three dimensional model of a feature of the customer. In this instance, the feature shell is a three dimensional model of the head and neck of the customer. The shell selector 2002, in this example, is a pull-down menu that can allow the user to select one of several feature shells that are available. The feature shells can have different characteristics such as relative size of elements of the feature shell and proportions of the feature shell. For example, the relative size of the skull and spacing of the eyes, size of nose, overall height and other aspects of the feature shell can be different among the different available feature shells. In the example shown, the shell selector 2002 can allow a feature shell to be selected based on an ethnicity. The available feature shells can also be selected based on gender. For the example, the available feature shells can be Caucasian male, Caucasian female, African male, African female, Asian male, Asian female. In other examples, the predetermined and available feature shells can have other differentiating characteristics or can be separated by other characteristics such as weight, gender, forehead size, chin size, or the like.

The user can select various feature shells using the feature shell selector 2002 in order to find a feature shell that most closely resembles the shape of the customer's features (e.g., spacing of eyes, shape of head, size of chin, etc.). The user can also use the shell modification controls 2004 to manipulate and change aspects of the selected feature shells. In the example shown, the shell modification controls 2004 includes a slider bar to change the scale of the feature shell and another slider bar to control the y-position (i.e., height) of feature shell. In other examples, the shell modification controls 2004 can include other controls to modify aspects of the feature shell such as x-position, stretching control, width control, roundness controls and the like.

The user can aspects of the selected feature shell to fit the feature shell to the actual contours and shape of the customer's head. Once the feature shell is fit to the customer's head, the user can save or store the feature shell. The measurement engine 1522 can then build the three dimensional model using the feature shell (as modified by the user).

The measurement engine 1522 can also provide other functionality to a user via the builder interface 2000. For example, the builder interface 2000 can allow a user to measure a desired measurement on the customer's head. Such functionality may be desirable because a vendor may need a particular measurement in order to produce a wig that a customer has ordered. For example, a customer may want the wig to have a specific overall length and a particular size of bangs. The required measurements for this feature need, typically, to be measured on the customer at a wig salon. The measurement engine 1522 can make this measurement on the three dimensional model.

In the example shown in FIG. 20, the builder interface 2000 can include the dimensional tool 1800. The dimensional tool 1800 can be selector by which the user can select the type of measurement that is desired. For example, the user may want a circumference on the customer's head. In other instances, the user may want a width or length or a surface length along the contours of the customer's head. The dimensional tool 2008 can allow the user to select the type of measurement (e.g. on a pull-down menu). The user then can select the amount of points on the three dimensional model 2006 and the measurement engine 1522 can automatically determine the desired measurement.

Referring back to FIG. 15, the hair product selection system 1500 can include the database 1510 that can store customer information data 1526. The customer information data 1526 can include customer characteristic data and customer image data. The customer information data 1526 can include various information about the customer that was collected during registration on the hair product selection system and also include information regarding orders, preferences, measurements, three dimensional model information and the like. The customer information data 1526 can also include customer image data for the images that the customer may upload or make available to the hair product selection system 1500. The measurement engine 1522 may store images, measurement data, three dimensional model data and other information as customer information 1526 in the database 1510.

The database 1510 may also include product try-on data 1528. The product try-on data 1528 can include data and other information to allow a customer to try on a product virtually and display an image to the customer of a product on the customer. The product try-on data 1528 can include an augmented reality (AR) package for one or more of the products that are available via the hair product selection system 1500.

The hair product selector 102 can include the try-on engine 1524. The try-on engine 1524 can allow the customer to virtually try on a product. The try-on engine can display a three dimensional representation of the customer and of the product that can be manipulated by the customer. The customer can rotate the three dimensional representation to view the front, back, sides, top and bottom of the product. The three dimensional model of the customer that can be created by the measurement engine 1522 can be used by the try-on engine 1524. The try-on engine 1524 can also obtain a product augmented reality (AR) package from the database 1510 that can be fit and displayed on the three-dimensional model of the customer.

The product AR package can be created by scanning a product using a laser scanner or other suitable data modeling hardware and software. Such three dimensional data packages can be large files. It can be difficult, using existing communication networks, to display such three dimensional data packages in real time on user's computing devices. The product AR package can, therefore, be modified to make the size of the product AR package smaller so that it can easily be displayed for a user.

A product AR package can be created for each product that is made available on the hair product selection system 1500. In some examples, once a product and the necessary product details are uploaded or otherwise entered into the hair product selection system 1500, a product AR package can be automatically created for the product. The product AR package can be modified to make the product AR package more easily displayed to a user.

The hair product selection system 1500 can operate to implement various methods of selecting hair products, of measuring customer features and displaying representations of hair products. The descriptions below describe the example methods in the context of the hair product selection system 1500. It should be appreciated, however, that such methods can be implements by other system and the other example systems described in the present disclosure.

Figure 16:
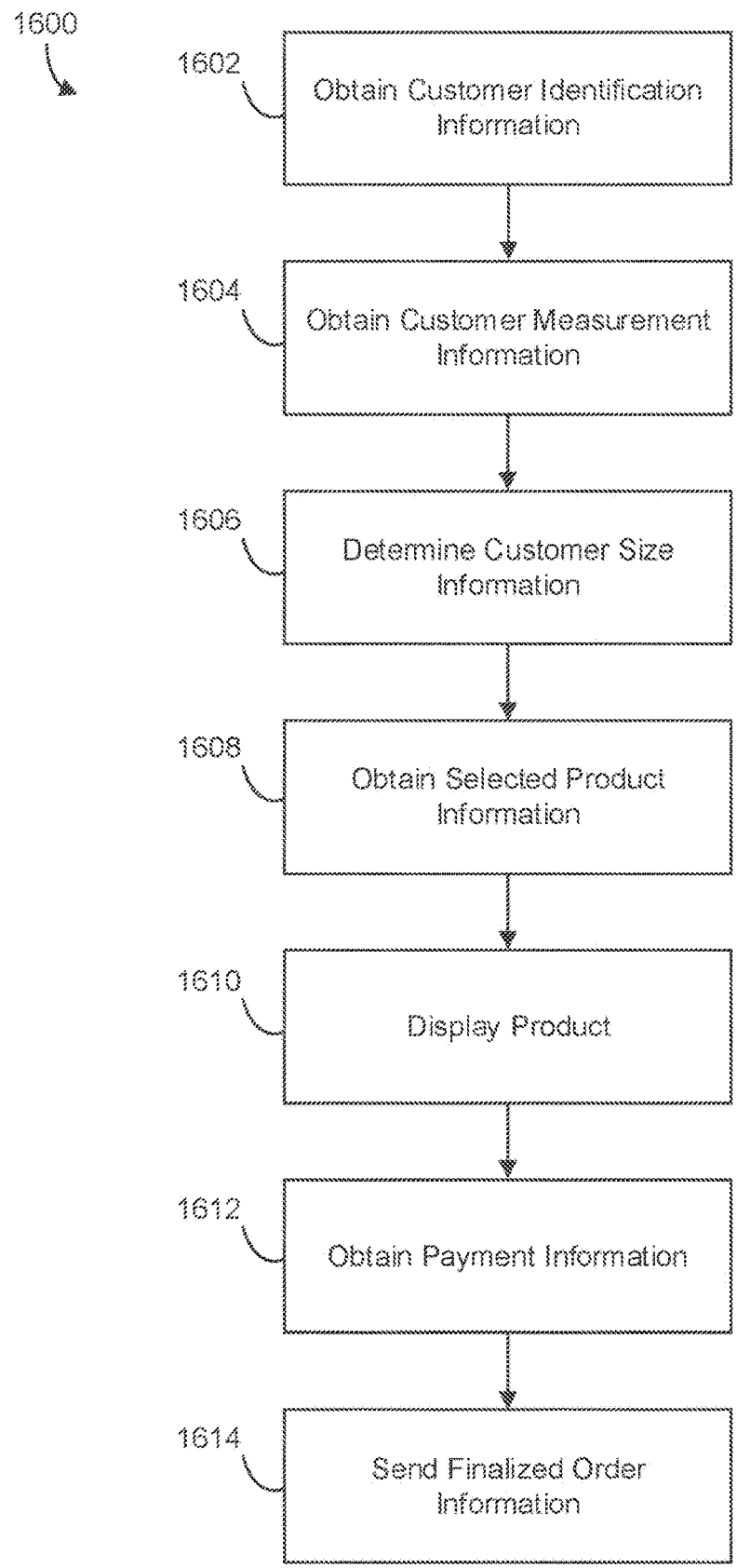
FIG. 16 is a flow chart illustrating an example method of selecting a hair product using a hair product selection tool of the present disclosure.

Referring now to FIG. 16, a method 1600 of selecting a hair product is shown. The method 1600 may begin at step 1602. At step 1602, the hair product selector 1502 can obtain customer identification information. The customer identification information can include a name, address or other identifying information. The customer identification information may be stored, for example, in the database 1510. In other examples, the customer may enter the customer identification information and the hair product selector 1502 can obtain the information from the customer computing device 1508.

At step 1604, the hair product selector 1502 can obtain customer measurement information. The customer measurement information can be obtained from the database 1510. In other examples, the measurement engine 1522 can obtain such information based on the three dimensional customer feature model that is created by the measurement engine 1522. The measurement engine 1522 can, for example, automatically collected predetermined measurements from the model to determine the shape size and contour of a customer's head.

At step 1606, the hair product selector 1502 may determine customer size information. Different products may, for example, be produced in varying sizes. For such products, the hair product selector 1502 may automatically determine a customer's size for the hair product based on the customer measurement information obtained at step 1604.

At step 1608, the hair product selector 1502 may obtain selected product information. The hair product selector 1502 can, for example, receive selected product information from the customer computing 1508. The customer may be browsing various hair products that are available on the hair product selection system 1500 such as by using the various product interfaces previously described. When the customer sees a product that is of interest, the customer can select such a product by clicking or otherwise selecting the product. After the customer indicates an interest by clicking on the product, the hair product selector 1502 can obtain or receive such indication.

At step 1610, the hair product selector 1502 can display the selected product for viewing by the customer. The hair product selector 1502 can, for example, cause the selected product to be displayed in a customer display on the customer computing device 1508. The display can be a virtual try-on that allows the customer to view the product virtually as if the customer is wearing the product. In some instance, the hair product selector 1502 can implement the display as an augmented reality (AR) display in which the customer can view, rotate, and otherwise interact with a three dimensional model of the customer and the product to provide a realistic view of the product being worn by the user.

While not shown in FIG. 16, the hair product selector 1502 can repeat steps 1608 and 1610 when the customer selects different products for viewing. In this manner, the customer can have a more interactive and satisfying shopping experience in which the customer can try on multiple different products and have a realistic shopping experience despite viewing all the products on a smart phone or other computing device. Furthermore, the customer can modify and customize the products as the customer is viewing the products. In such instances, the hair product selector 1502 can obtain hair product customization data in response to a customer's interactions on the hair product selection system 1500.

When the customer has finalized a product for purchase, the hair product selector 1502 can obtain payment information at step 1612. The payment information may be stored in the database 1510 or can be entered by the customer on the customer computing device 1508.

At step 1614, the hair product selector 1502 can send finalized order information. The finalized order information can include customer information, product information and payment information. The finalized order information can be sent to a vendor of the hair product selection system 1500 so that the product can be produced and then shipped to the customer. The finalized order information can also be sent to the customer.

The foregoing method is an improvement over existing methods because it can be performed and allow a virtual experience for the customer without the need for the customer to physically try on the products or for the customer to visit a brick and mortar establishment. Still further, the display of the product allows for the viewing of a three dimensional product such as a wig by the customer.

Figure 17:
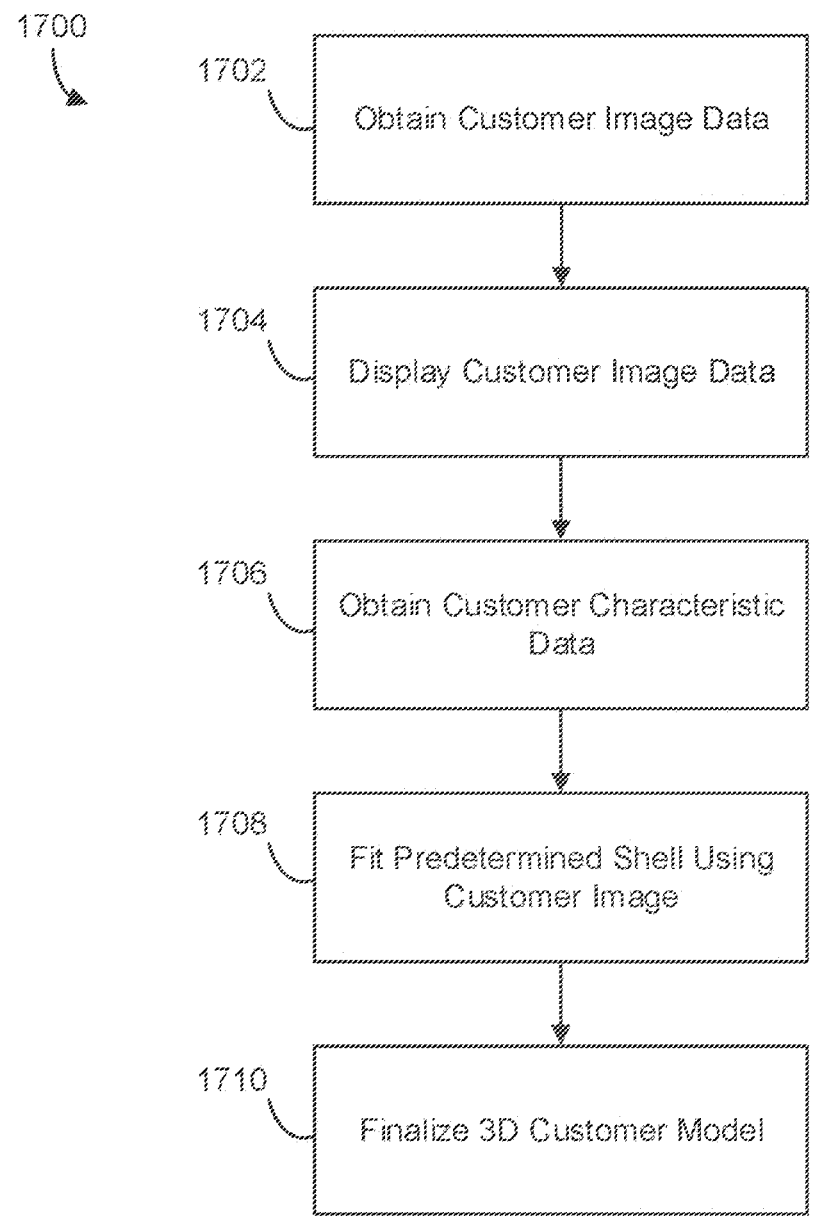
FIG. 17 is a flow chart illustrating an example method of measuring a customer's features in accordance with the present disclosure.

Referring now to FIG. 17, an example method 1700 of creating a three dimensional (3D) model of a customer is shown. The measurement engine 1522 of the hair product selector 1502 can perform the method 1700 in some examples. The method can begin at step 1702. At step 1702, the hair product selector 1502 can obtain customer image data. The customer image data can be one or more images of the customer. The hair product selector 1502 can, for example, obtain the customer image data when the customer takes one or more images using the camera of his or her smart phone. The customer image data can include the customer and a measurement indicator, such as measurement indicator 1802 previously described.

At step 1704, the hair product selector 1502 can display the customer image data. The customer image data can, for example, be displayed on the builder interface 2000 previously described. In the example shown in FIG. 20, the customer image data can be displayed orthogonally to each other in the builder interface 2000. If more than two images are used, the additional images can also be aligned and displayed.

At step 1706, the hair product selector 1502 can obtain customer characteristic data. The customer characteristic data can be information that describes a characteristic of the customer such as gender, ethnicity, head shape, body size, body type or the like. The customer characteristic data can be obtained by the hair product selector 1502 through a users interactions with the builder interface 2000. For example, the user can use the feature shell selector to indicate customer characteristic data. The received customer characteristic data can then be used by the hair product selector 1502 to select the appropriate predetermined feature shell and to display the selected feature shell in the builder interface 2000.

At step 1708, the hair product selector 1502 can fit the feature shell to the customer image. In some examples, a user can use the builder interface 2000 and the shell modification controls 2004 to align the feature shell with the customer image. In other examples, the hair product selector 1502 can automatically fit the feature shell to the customer image using one or more anchor points on the customer image and one more anchor points on the feature shell. The anchor points can be distinguishing points of the customer's head shape such as the nose, chin, crown of the head, etc. In still other examples, a machine learning model can be used to automatically fit a feature shell to the customer image.

At step 1710, the hair product selector 1502 can finalize the three dimensional model. The finalized three dimensional model can stored and then retrieved for later use. The three dimensional model can be used by vendors to measure aspects of the customers head. The three dimensional model can also be used to allow the customer to use the virtual try-on features of the hair product selection system 1500. Still further, the three dimensional model can be used to retain the machine learning models of the hair product selection system 1500 and to evaluate the performance thereof over time.

Figure 21:
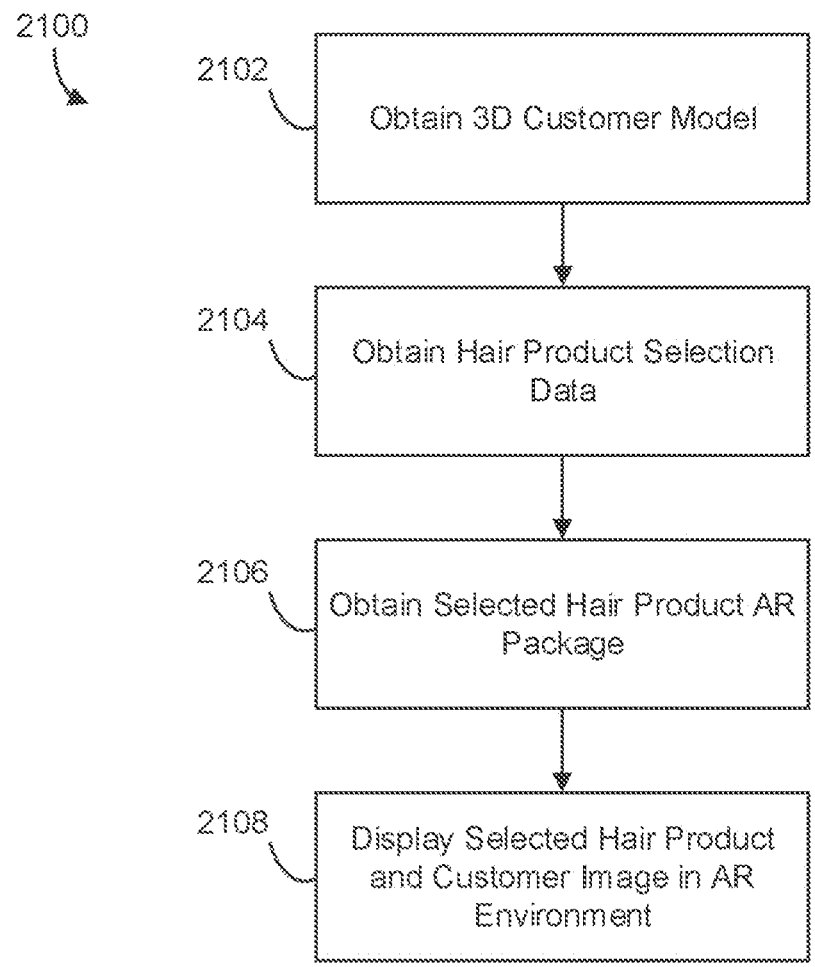
FIG. 21 is a flow chart illustrating an example method of displaying a hair product on a customer in accordance with the hair product selection systems of the present disclosure.

Referring now to FIG. 21, a method displaying a virtual product try-on is shown. The method begins at step 2102. At step 2102, the hair product selector 1502 can obtain three dimensional (3D) customer model data. The 3D customer model data can be the three dimensional model created using the method 1700 or using other methods of the present disclosure. The hair product selector 1502 can obtain the 3D model from the database 1510, for example.

At step 2104, the hair product selector 1502 can obtain hair product selection data. The hair product selection data can be the same as the selected product information obtained at step 1608 of method 1600. The hair product selection data can identify which hair product that the customer would like to try-on using the virtual try-on functionality of the hair product selection system 1500.

At step 2106, the hair product selector 1502 can obtain the Augmented Reality (AR) package for the selected hair product. As previously described, AR packages for the hair products available on the hair product selection system 1500 can be created using suitable methods and can be compressed or otherwise sized so as to allow display and manipulation on a customer's mobile computing device 1508. The AR packages can be stored on the database 1510. The hair product selector 1502 can obtain the AR packages from the database 1510, for example.

At step 2108, the hair product selector 1502 can display the customer image (e.g., three dimensional customer model) and the selected hair product (e.g., AR package) in an augmented reality environment. The augmented reality environment can allow the user to rotate, size, zoom, or otherwise manipulate the model of the customer wearing the selected hair product on the customer's computing device 1508.

As can be appreciated, the method 2100 can be repeated as the customer browses for different products on the hair product selection system 1500. In this manner, the customer can view different products, can customize and view the products and have an engaging and satisfying shopping experience.

The example methods and apparatuses described herein may be at least partially embodied in the form of computer-implemented processes and apparatus for practicing those processes and/or the described functionality. The disclosed methods may also be at least partially embodied in the form of tangible, non-transient machine readable storage media encoded with computer program code. The media may include, for example, RAMs, ROMs, CD-ROMs, DVD-ROMs, BD-ROMs, hard disk drives, flash memories, or any other non-transient machine-readable storage medium, or any combination of these mediums, wherein, when the computer program code is loaded into and executed by a computer, the computer becomes an apparatus for practicing the method. The methods may also be at least partially embodied in the form of a computer into which computer program code is loaded and/or executed, such that, the computer becomes an apparatus for practicing the methods. When implemented on a general-purpose processor, the computer program code segments configure the processor to create specific logic circuits. The methods may alternatively be at least partially embodied in a digital signal processor formed of application specific integrated circuits for performing the methods.

The term machine learning model as used in the present disclosure includes data models created using machine learning and/or artificial intelligence. Machine learning may involve training a mathematical model in a supervised or unsupervised setting. Machine learning models may be trained to learn relationships between various groups of data. The models may be based on a set of algorithms that are designed to model abstractions in data by using a number of processing layers. The processing layers may be made up of non-linear transformations. Machine learning models may include, for example, neural networks, convolutional neural networks and deep neural networks. Such neural networks may be made of up of levels of trainable filters, transformations, projections, hashing, and pooling. The models may be used in large-scale relationship-recognition tasks. The models can be created by using various open-source and proprietary machine learning tools known to those of ordinary skill in the art.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A method for selecting a hair product comprising: obtaining, by at least one processor, customer data, wherein the customer data comprises at least one of image data of a customer and measurement data;
   generating, by the at least one processor, a three-dimensional model of the customer using the customer data;
   obtaining, by the at least one processor, the image data of the customer, selecting a pre-defined feature shell, aligning and adjusting the image data of the customer and the pre-defined feature shell to generate the three-dimensional model of the customer;
   retrieving, by the at least one processor, a product augmented reality package comprising three-dimensional image data for at least one product;
   displaying, by the at least one processor, a representation of the at least one product on the three-dimensional model of the customer using the product augmented reality package and the three-dimensional model of the customer, wherein the representation of the at least one product is at least one of rotatable and zoom adjustable;
   wherein the pre-defined feature shell is automatically fit to the image data of the customer using one or more anchor points located on the pre-defined feature shell and one or more anchor points located on the image data of the customer; and
   wherein the one or more anchor points located on the image data of the customer are distinguishing points of a head shape of the customer.

2. The method of claim 1, wherein the product augmented reality package is automatically retrieved as a compressed file.

3. The method of claim 1, wherein the pre-defined feature shell is automatically fit to the image data of the customer using a machine learning model.

4. The method of claim 1, further comprising measuring a dimension of a head of the customer using the three-dimensional model of the customer.

5. The method of claim 1, further comprising modifying the representation of the at least one product when depicted on the three-dimensional model of the customer.

6. The method of claim 1, further comprising recording product data when a desired look is achieved using the product augmented reality package and the three-dimensional model of the customer.

7. The method of claim 6, further comprising automatically creating a product order using the recorded product data.

8. The method of claim 1, further comprises capturing two orthogonal images of the customer and a measurement indicator in each of the two orthogonal images of the customer as the customer data, and automatically generating, by the at least one processor, the three-dimensional model of the customer from the two orthogonal images of the customer.

9. A computer program product comprising a non-transitory computer-readable storage medium containing computer program code, the computer program code when executed by one or more processors causes the one or more processors to perform operations, the computer program code comprising instructions to:
   obtain customer data, wherein the customer data comprises at least one of image data of a customer and measurement data;
   obtain the image data of the customer, select a pre-defined feature shell, align and adjust the image data of the customer and the pre-defined feature shell to generate the three-dimensional model of the customer;
   generate a three-dimensional model of the customer using the customer data; retrieve a product augmented reality package comprising three-dimensional image data for at least one product; and
   display a representation of the at least one product on the three-dimensional model of the customer using the product augmented reality package and the three-dimensional model of the customer, wherein the representation of the at least one product is at least one of rotatable and zoom adjustable;
   wherein the pre-defined feature shell is automatically fit to the image data of the customer using one or more anchor points located on the pre-defined feature shell and one or more anchor points located on the image data of the customer; and
   wherein the one or more anchor points located on the image data of the customer are distinguishing points of a head shape of the customer.

10. The computer program product of claim 9, wherein the product augmented reality package is automatically retrieved as a compressed file.

11. The computer program product of claim 9, wherein the pre-defined feature shell is automatically fit to the image data of the customer using a machine learning model.

12. The computer program product of claim 9, wherein the computer program code further comprises instructions to measure at least one dimension of a head of the customer using the three-dimensional model of the customer.

13. The computer program product of claim 9, wherein the computer program code further comprises instructions to modify the representation of the at least one product when depicted on the three-dimensional model of the customer.

14. The computer program product of claim 9, wherein the computer program code further comprises instructions to record product data when a desired look is achieved using the product augmented reality package and the three-dimensional model of the customer.

15. The computer program product of claim 14, wherein the computer program code further comprises instructions to automatically create a product order using the recorded product data.

16. The computer program product of claim 9, wherein the computer program code further comprises instructions to capture two orthogonal images of the customer and a measurement indicator in each of the two orthogonal images of the customer as the customer data, and automatically generate, by the one or more processors, the three-dimensional model of the customer from the two orthogonal images of the customer.

\* \* \* \* \*